United States Patent [19]

Baba et al.

[11] Patent Number: 5,758,057
[45] Date of Patent: May 26, 1998

[54] MULTI-MEDIA STORAGE SYSTEM

[75] Inventors: Hiroshi Baba; Shiro Ogura; Masahiro Mizuno; Kazuhiko Ito; Hitoshi Yamamoto, all of Tokyo, Japan

[73] Assignee: Mitsubishi Denki Kabushiki Kaisha, Tokyo, Japan

[21] Appl. No.: 661,942

[22] Filed: Jun. 11, 1996

[30] Foreign Application Priority Data

Jun. 21, 1995 [JP] Japan ................. 7-154486

[51] Int. Cl.⁶ .................. G06F 11/20; G06F 11/10
[52] U.S. Cl. .................. 395/182.05; 711/114
[58] Field of Search ............ 395/182.05, 182.04, 395/182.18, 185.08, 441; 371/61

[56] References Cited

U.S. PATENT DOCUMENTS

| | | | |
|---|---|---|---|
| 4,404,647 | 9/1983 | Jones et al. | 395/182.04 |
| 5,388,254 | 2/1995 | Betz et al. | 395/185.08 |
| 5,390,327 | 2/1995 | Lubbers et al. | 395/182.04 |
| 5,469,463 | 11/1995 | Polich et al. | 395/182.18 |
| 5,522,031 | 5/1996 | Ellis et al. | 395/182.05 |
| 5,544,339 | 8/1996 | Baba | 395/441 |
| 5,583,995 | 12/1996 | Gardner et al. | 395/200.49 |
| 5,596,747 | 1/1997 | Katabami et al. | 395/182.05 |
| 5,603,058 | 2/1997 | Belknap et al. | 395/855 |
| 5,611,069 | 3/1997 | Matoba | 395/441 |
| 5,613,088 | 3/1997 | Achiwa et al. | 711/155 |
| 5,655,150 | 8/1997 | Matsumoto et al. | 395/837 |

FOREIGN PATENT DOCUMENTS

| | | | |
|---|---|---|---|
| 0569236 | 11/1993 | European Pat. Off. | 395/182.04 |
| 2299424 | 10/1996 | United Kingdom | 395/182.04 |
| WO91/13394 | 9/1991 | WIPO | 395/182.04 |
| WO91/15822 | 10/1991 | WIPO | 395/182.04 |
| WO94/29795 | 12/1994 | WIPO | 395/182.04 |

*Primary Examiner*—Robert W. Beausoliel, Jr.
*Assistant Examiner*—Scott T. Baderman
*Attorney, Agent, or Firm*—Wolf, Greenfield & Sacks, P.C.

[57] ABSTRACT

In case of consecutive transmission of a large amount of data such as dynamic image data, a multi-media storage system of the invention generates and transmits data stored in a faulty disk drive when one of a plurality of disk drives being faulty caused by an internal calibration or an error of the disk drive and the faulty disk drive does not respond within a predetermined length of time set in a timeout table. The multi-media storage system cancels an access to the faulty disk drive, generates data to be read from the faulty disk drive based on data stored in the other disk drives of the plurality of disk drives and the redundant data and continues to transmit data.

15 Claims, 26 Drawing Sheets

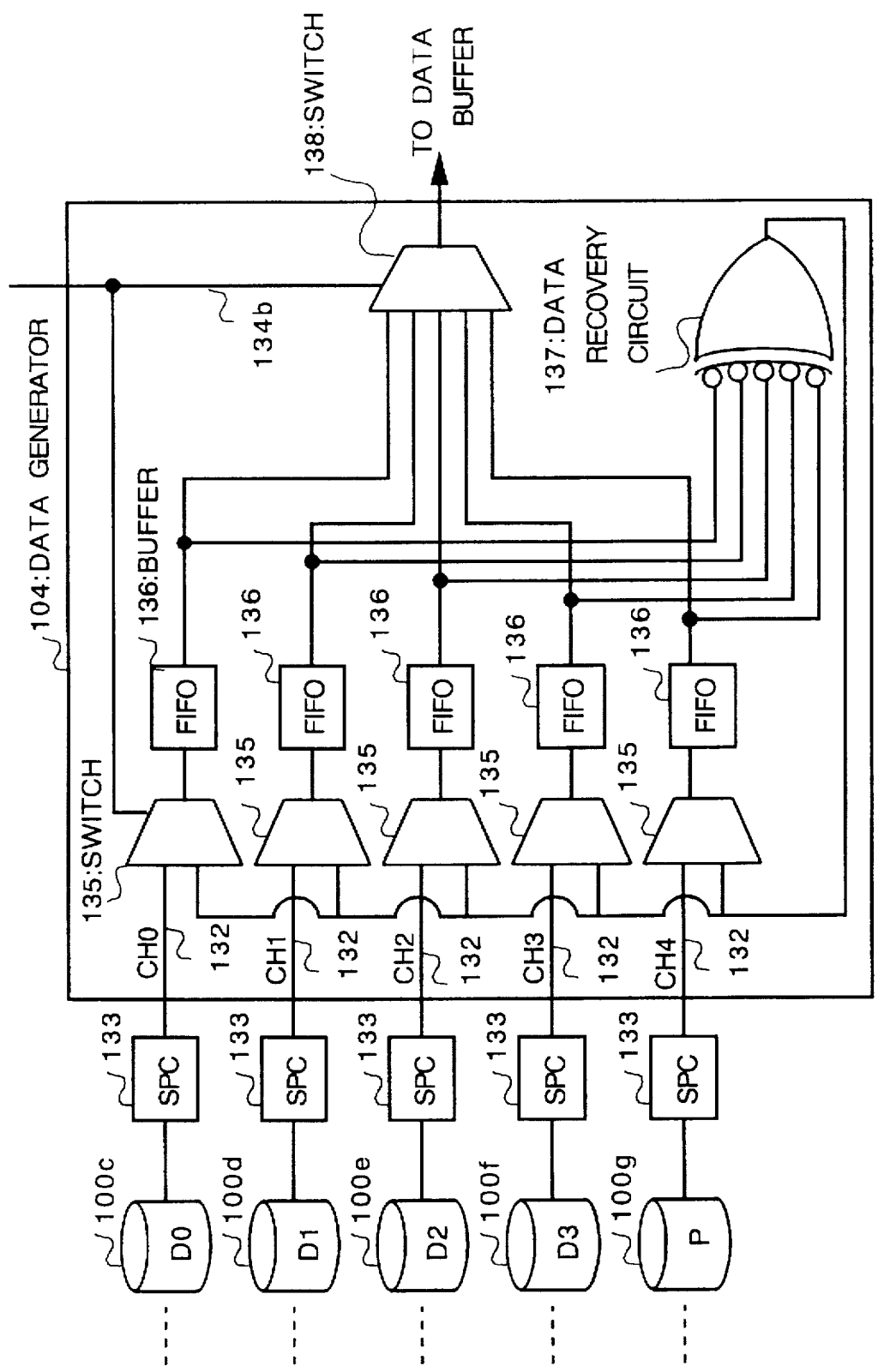

Fig.7A

103:TIMEOUT TBL

| | |
|---|---|
| USER1 | 22ms |
| USER2 | 30ms |
| USER3 | 25ms |
| ⋮ | ⋮ |
| USERn | 30ms |

Fig.7B

121:DISK CONFIG. TBL

| | |
|---|---|
| TRANS. SPEED BETW. DD AND BUFFER | 10 MB/s |
| AVE. SEEK TIME | 16ms |
| SEEK TIME TO NEXT TRACK | 0.6ms |
| ROTATIONAL DELAY | 4ms |
| ERROR RETRY | 3TIMES |
| NO. OF DISKS | 4 |

Fig.8

(a) D0 XOR D1 XOR D2 XOR D3 XOR DP = 0

(b) DATA (D0) OF FAULTY D.D. 100c IS OBTAINED BY:

D0 = D1 XOR D2 XOR D3 XOR DP

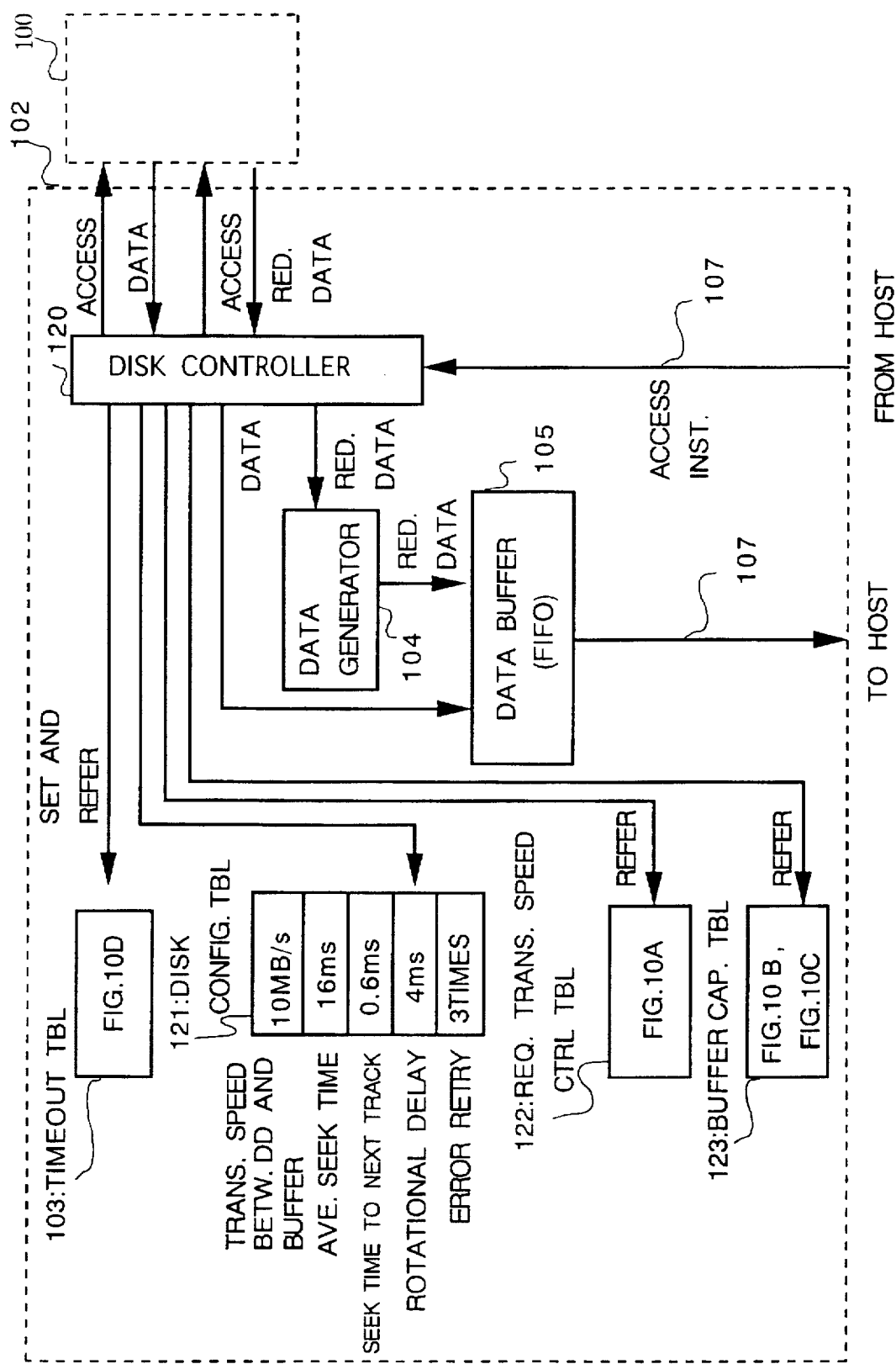

Fig.10A

122 : REQ. TRANS. SPEED CTRL TBL

| USER | Speed |
|---|---|
| USER1 | 1MB/s |
| USER2 | 2MB/s |
| USER3 | 2MB/s |
| ⋮ | ⋮ |
| USERn | 1MB/s |

Fig.10B

123:BUFFER CAP. TBL

| USER | Capacity |
|---|---|
| USER1 | 100KB |
| USER2 | 100KB |
| USER3 | 100KB |
| ⋮ | ⋮ |
| USERn | 100KB |

Fig.10C

123:BUFFER CAP. TBL

| USER | Capacity |
|---|---|
| USER1 | 60KB |
| USER2 | 80KB |
| USER3 | 100KB |
| ⋮ | ⋮ |
| USERn | 100KB |

Fig.10D

103:TIMEOUT TBL

| USER | Timeout |
|---|---|
| USER1 | 70.0ms |
| USER2 | 20.0ms |
| USER3 | 20.0ms |
| ⋮ | ⋮ |
| USERn | n |

Fig.11

103:TIMEOUT TBL

| | |
|---|---|
| USER1 | 34ms |
| USER2 | 12ms |
| USER3 | 20ms |
| ⋮ | ⋮ |
| USERn | n |

Fig.13

124:EXPECTED RES. TIME
CTRL TBL

| | |
|---|---|
| USER1 | 100ms |
| USER2 | 200ms |
| USER3 | 39ms |
| | ⋮ |
| USERn | n |

Fig.15

| | 103:TIMEOUT TBL |
|---|---|
| USER1 | 70ms |
| USER2 | 20ms |
| USER3 | 19ms |
| ⋮ | ⋮ |
| USERn | n |

Fig.17

| | |
|---|---|
| (A) | D0 XOR D1 XOR · · · XOR Dn = 0<br>Dk : DATA STORED IN THE SAME ADDRESS IN DISK #k<br>XOR : EXCLUSIVE OR |
| (B) | D0 XOR D1 XOR D2 XOR DPO = 0<br>DPO : DATA OF OLD PARITY DISK (PARITY OLD) |
| (C) | D0 XOR D1 XOR D2 XOR D3 XOR DPN = 0<br>DPN : DATA OF NEW PARITY DISK (PARITY NEW) |
| (D) | D0 XOR D1 XOR D2 XOR D3 XOR DPN<br>= D0 XOR D1 XOR D2 XOR DPO<br>⇒ D3 XOR DPN = DPO<br>⇒ DPN = DPO XOR D3 |

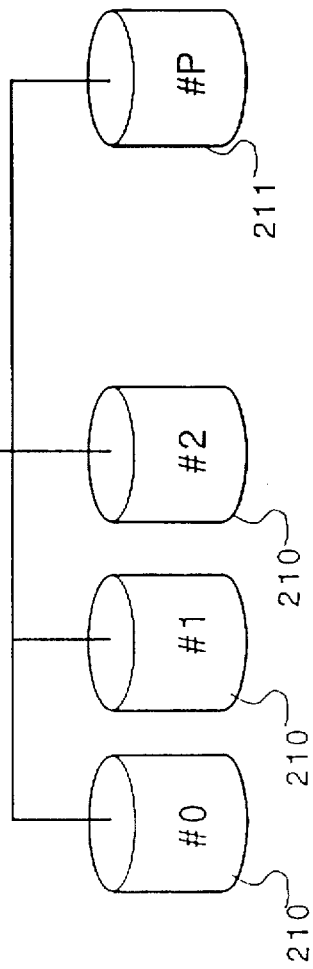
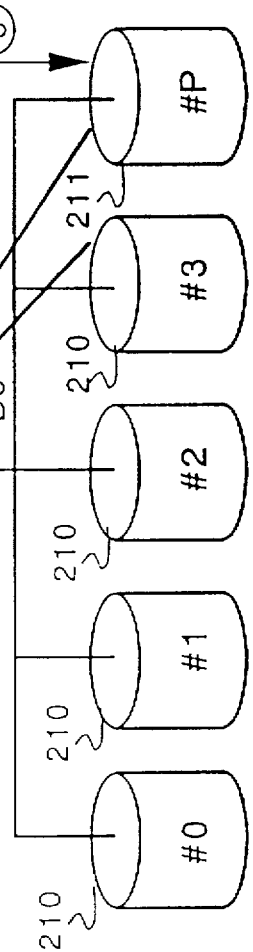

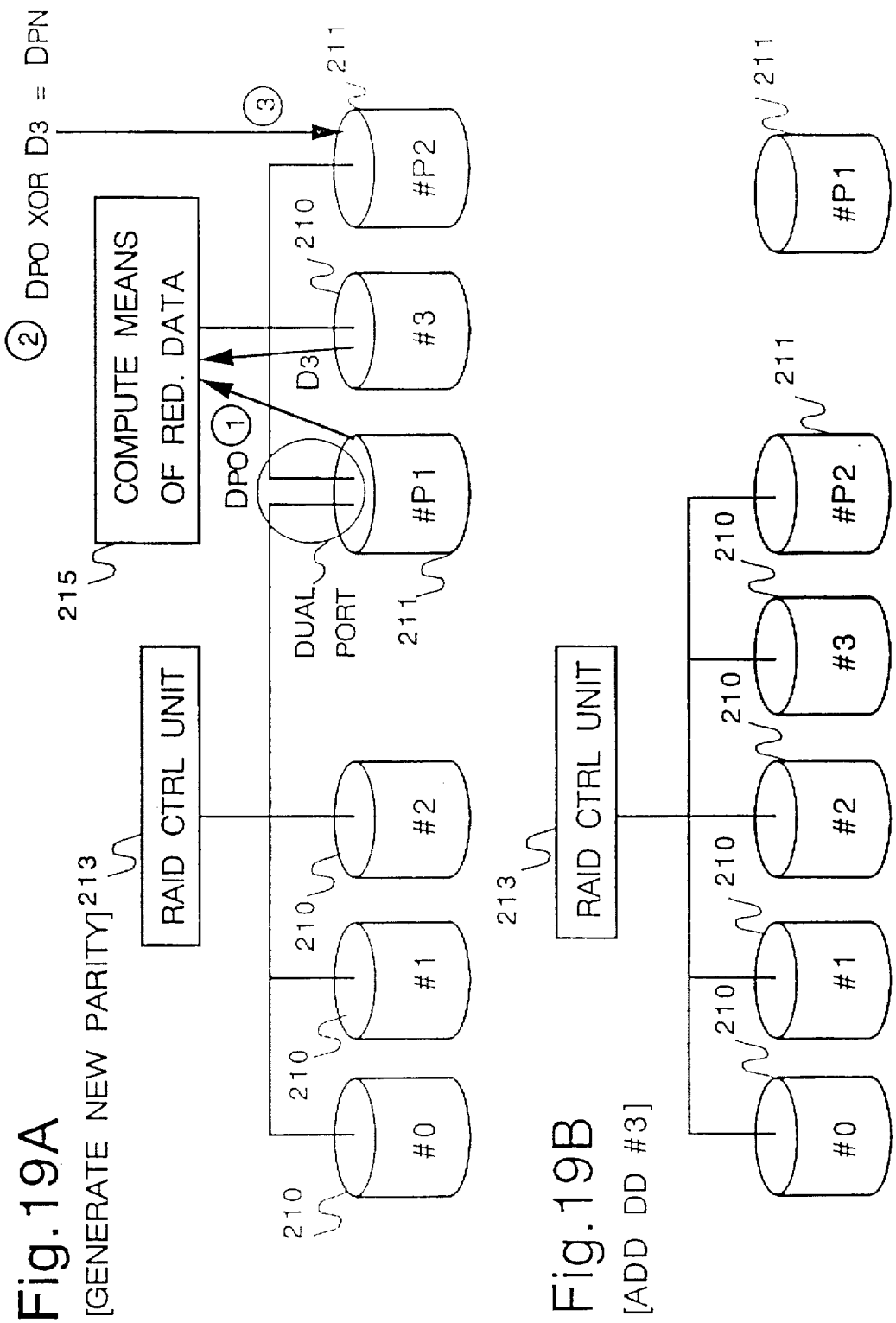

1

MULTI-MEDIA STORAGE SYSTEM

BACKGROUND OF THE INVENTION

1. Field of the Invention

The present invention relates to a multi-media storage system which responds to an access request in a predetermined length of time. The invention also relates to a multi-media storage system which generates and transmits data from an unaccessed storage device in the system in the case that the storage system cannot respond to the access request in the predetermined length of time.

The present invention also relates to a multi-media storage system which stores a great amount of data, and to a multi-media storage system where a new storage device can be added easily, to increase of the amount of data available.

2. Description of the Related Art

Related Art 1

Conventionally, in the case of serially transmitting a great amount of data, such as dynamic image data, data transmission is suspended when data is read during migration of an internal head of a disk drive. To prevent the suspension of the data transmission, data is temporally stored in a buffer memory while the internal head is moved for reading the next element of data.

FIG. 20 explains the above operation.

In FIG. 20, a personal computer or workstation 300 is connected to a buffer memory 301 which is included in a control unit (the control unit is not shown in the figure) via a communication line 303. The buffer memory 301 is provided to enable the personal computer or workstation 300 to consecutively transmit data at a speed of 3 MBs via the communication line 303. The buffer memory 301 is connected to a disk drive 302 via a communication line 304. The disk drive 302 can transmit data at a maximum speed of 10 MBs via the communication line 304. The buffer 301 needs a data capacity of 600 KB (3 MBs*200 ms=600 KB) to store data during an internal calibration (30 ms–200 ms) of the disk drive 302. Further, a data capacity of 90 MB (3 MBs*30 s=90 MB) is needed by the buffer for an internal error retry (30 s–45 s) of the disk drive 302. Therefore, in the related art, the buffer memory 301 does not have enough capacity for the error retry.

Related Art 2

According to other related art, entitled "Transmitting System and Apparatus for Parallel Data", which is disclosed in Japanese Unexamined Patent Publication No. HEI2-81123, a reading error is detected based on a data delay. Data loss which is caused by the read error is generated from the rest of the data. Accordingly, a delay or suspension of transmitting all of the data is avoided.

FIG. 21 is a block diagram of an embodiment of the Related Art 2.

FIG. 22 is a block diagram of a parity generator/data recovery circuit of FIG. 21.

FIG. 23 shows a circuit of a recovery controller 14 of FIG. 22.

FIG. 24 is a timing chart showing an operation of a circuit of FIG. 23.

A system provided by the Related Art 2 avoids a data transmission delay caused by missynchronizaion, or a delay and suspension of transmitting data caused by a read error. In the following description, a delay of data is detected and a data error will be recovered by the system and apparatus of the Related Art 2.

Data which is read from a magnetic disk drive 9 is converted to 8-bit data by a hard disk controller 8, and is then stored in a data buffer 7. Data stored in data buffers 70, 71, 72, 73 and 7P which does not contain read errors is transmitted to a bus controller 3 via a selector 5. The data is then converted to 32-bit data and transmitted to a bus 2. This is synchronized with a data ready signal 13a. The data is then transmitted to a host system from the bus 2. By providing a magnetic disk drive 9P for storing parity data, when one of the magnetic disk drives 90, 91, 92, 93 and 9P becomes faulty, the data of the faulty disk drive can be recovered, by generating the lost data from data stored in the other magnetic disk drives.

For example, suppose that the magnetic disk drive 93 becomes faulty and data cannot be read from the magnetic disk drive 93. The data D3 of the magnetic disk drive 93 will be recovered by the following expression.

D3=D0 XOR D1 XOR D2 XOR DP where: D0, D1, D2, and DP mean data stored in the disk drives 90, 91, 92, and 9P, respectively.

The above data recovery is executed by a parity generator/data recovery circuit 6. The recovered data is output by the parity generator/data recovery circuit 6 to a port "b" of the selector 5. An error signal 13 is issued to inform the selector corresponding to the faulty magnetic disk drive 93, of the error of the faulty disk drive 93. The selector then selects the generated data input from the port "b" to replace the error data.

In the following description, a data delay caused by missynchronizaion will be recovered.

In FIG. 24, disk drives DRV 0–3, and P (the magnetic disk drives 90, 91, 92, 93 and 9P) of the magnetic disk drive 9 execute reading data of sectors 0, 1, . . . serially and synchronously. It is assumed that an ECC (Error Correction Code) error occurs in DRV 3 on reading data of sector 1. Data stored in the corresponding sector of the data buffer cannot be transmitted. Operation timings of this state are shown as timings 99 in FIG. 24. Each of the timings 99 corresponds to REQ 0–3, and P, that is, the reading requests of data of the sector 1. A LRESET 22a is output at the timing 99a to clear an error locker 22. A timer 21 is also cleared by synchronization of REQ 0–3, and P of the sector 0. Then a REQ signal 150 is output to an OR gate 23 of FIG. 23 to start the timer 21.

After the output of the REQ signal 150, REQ 1, REQ 2 and REQ P are output before a Timeout signal 21a is issued. The REQ 3 is not output because of the reading error. In the AND gate 24 of FIG. 23, the outputs from REQ 0–3, and P are not ANDed and the timer 21 is not cleared by a REQREADY signal 24a. The timer 21 keeps on counting UP. At a timing 99b in FIG. 24, a timeout is detected by the timer 21 in FIG. 23 and a Timeout signal 21a is issued by the timer 21. Based on the Timeout signal 21a, the error locker 22 latches reverse signals of the values of REQ 0–3 and P at the Timeout. The outputs of the latched values are ORed with the REQ 0–3, and P to generate a signal 15a. The ORed result, the signal 15a corresponding to the REQ 3, is true, which causes each signal 15a of the REQ 0–3 and P to be true. At an AND gate 24, the outputs from REQ 0–3, and P are ANDed and the REQREADY signal 24a becomes true. The timer 21 is thus cleared and the Timeout signal 21a becomes false. A signal 23a which is an output from the OR gate 23, which starts the timer 21, is kept true based on the output from the error locker 22. The timer 21 does not start counting UP until the signal 23a becomes false again.

Under the above state, the AND condition of the AND gate 24 is fulfilled when the REQ 1, 2, and P are output, regardless of the signal output from the REQ 3 which makes the DATAREADY signal 13a true. The AND condition of the AND gate 25 is fulfilled to make the DATAREADY signal 13a true, unless an error detector 20 detects any error. The DATAREADY signal 13a is transmitted to a bus controller 3 of FIG. 21 and becomes a synchronous signal for transmitting data.

The error locker 22 outputs ERROR 0-3, and P as error signals 160, 161, 162, 163, and 16P, respectively. Only one selector of selector 17 in FIG. 22, corresponding to the faulty magnetic disk drive, is activated to select port "a" of the selector. The parity generator 18 outputs a recovery data 12 as shown in FIG. 22. The output recovery data 12 is obtained by the above expression, that is, the recovery data for the DRV 3 is obtained.

The output recovery data 12 is selected based on the error signal 13 shown in FIG. 21, where ERROR 0-3, and P are output from the error locker 22. In the above case of the error, ERROR 3 is true and the port "b" is selected by the selector corresponding to a data bus 113. The recovery data 12 is transmitted to the bus controller 3.

Related Art 3

Conventionally, image data such as video data is stored in a plurality of distributed disks.

FIG. 25 shows data storing layout in a RAID (redundant arrays of inexpensive disks) level 3 configuration.

FIG. 26 shows data storing layout also in a RAID level 3 configuration, where another hard disk drive is added to the configuration of FIG. 25.

In an example of FIG. 25, a disk array is configured by RAID level 3 using five disk drives, that is, four disk drives for data (disk drives #0-#3 in FIG. 25) and one disk drive for parity (disk drive #4 in FIG. 25). Data is distributed and stored in each disk drive by striping as shown in FIG. 25. In a case where another disk drive for data (disk drive #5 in FIG. 26) is added to the disk array of FIG. 25, data is distributed and stored in each disk drive by striping as shown in FIG. 26. When FIG. 26 compared with FIG. 25, it is clear that the data storing layout of six disk drives is different from data storing layout of five disk drives. Namely, most of the pieces of the data distributed and stored in each of the four data disk drives #0-#3 of FIG. 25 have to be re-distributed to each of five data disk drives #0-#3 and #5 of FIG. 26. Most of the parities generated and stored in the parity disk drive #4 of FIG. 25 also have to be re-generated and stored in the parity disk drive #4 of FIG. 26.

As described in the above related art 1, the problem exists in which the buffer memory needs to have a large capacity because of the internal calibration of the disk drive. Furthermore, another problem which exists is that the disk drive is not able to retry in the event of an internal error because of a lack of capacity of the buffer memory.

In the above related art 2, entitled "Transmitting System and Apparatus for Parallel Data", a missynchronization or reading error caused by a delay of parallel data is detected to start generation of error data. Transmitting data to the host system is suspended until the delay of data is detected (40 ms–50 ms) as shown in FIG. 24. The data buffer 7 in FIG. 21 is provided for correcting a rotation difference of DRVs 3 and P. The data buffer 7 does not function to transfer data to the host system. Therefore data cannot be serially transferred to the host system.

In the above related art 3, in the case when another disk drive is added to the disk array, data needs to be re-distributed and stored in each disk drive of the new configuration. It takes a long time to execute the complex process of re-distribution and storage of the data. There may also be a possibility of losing the data, which reduces the reliability of the storage device.

SUMMARY OF THE INVENTION

The present invention is provided to solve the above problems. In the storage system of the present invention, a retry caused by an error in the disk drive or by an internal calibration is detected by a response delay from the corresponding disk. Such an error in the data can be recovered by data in the other disk drives and transmission of the data to the host system can be continued by providing a data buffer, while the data recovery of the error data is executed.

Furthermore, according to the present invention, another disk drive can be easily added in such a multi-media storage system. When an error occurs in one of the disk drives, the error does not influence the other disk drives in the multi-media storage system.

The present invention is a storage system which provides responses to requests for data by users in a predetermined amount of time. A user is able to control the time limit required for data accesses to take place. If the data access to a disk drive which contains the data does not take place in the required amount of time, then the data required is produced by a redundant data generator mechanism and is provided to the user requesting the data. Then the system then proceeds to determine if the response to the data request which was originally sent to the disk drive is received within another time limit. If the response is received before this time limit expires, then the data received from the disk drive is written over the old data location and an error is logged. If this happens a predetermined number of times, the location of the data and the disk drive are determine to have an unrecoverable error and the disk drive is taken offline. The disk drive is taken offline if the response is never received from the original request as well.

BRIEF DESCRIPTION OF THE DRAWINGS

A more complete appreciation of the present invention and many of the attendant advantages thereof will be readily obtained as the present invention becomes better understood by reference to the following detailed description, when considered in connection with the accompanying drawings, wherein:

FIG. 6 shows a circuit configuration of a data generator of FIG. 5;

FIGS. 7A and 7B show a timeout table and a disk configuration table, respectively, included in the system of FIG. 5;

FIG. 8 shows an expression of data recovery using parity data;

FIG. 9 shows an operation of another multi-media storage system, where a requested transmitting speed control table is included in the control unit of FIG. 1, according to a third embodiment of the present invention;

Figure 1:
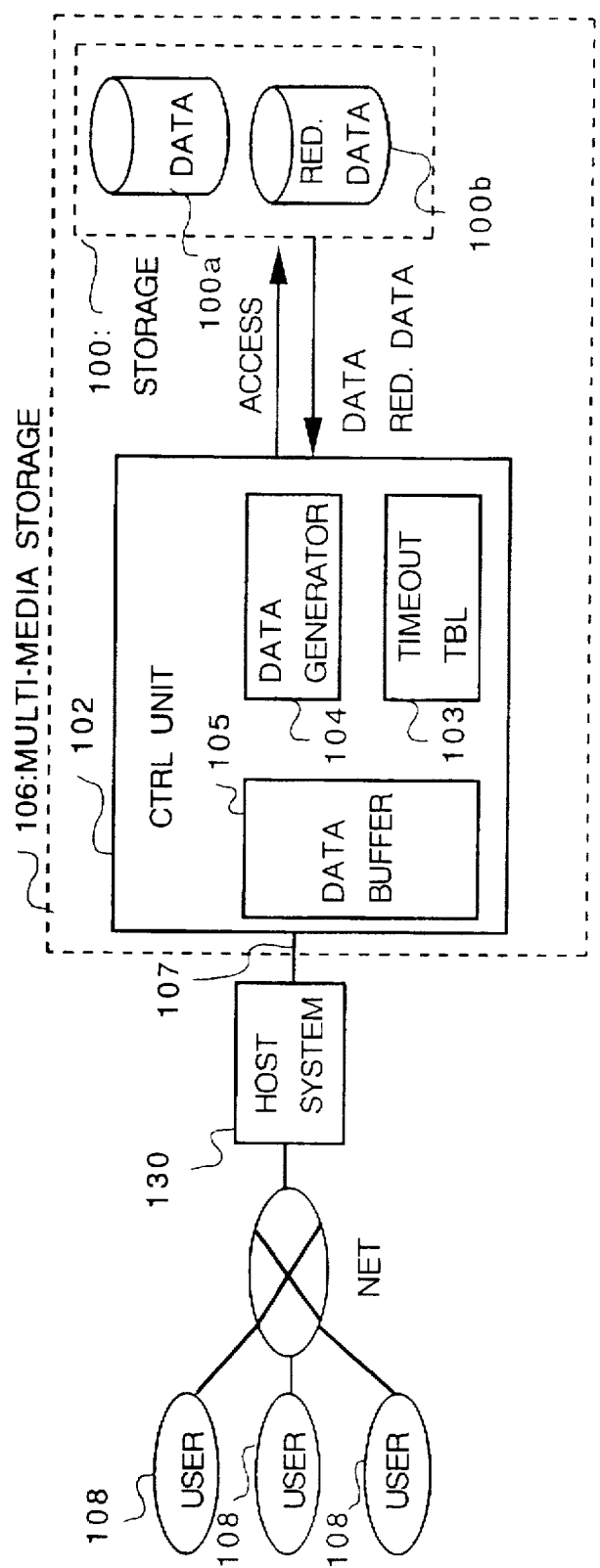
FIG. 1 shows an example of a multi-media storage system according to a first embodiment of the present invention.
Figure 12:
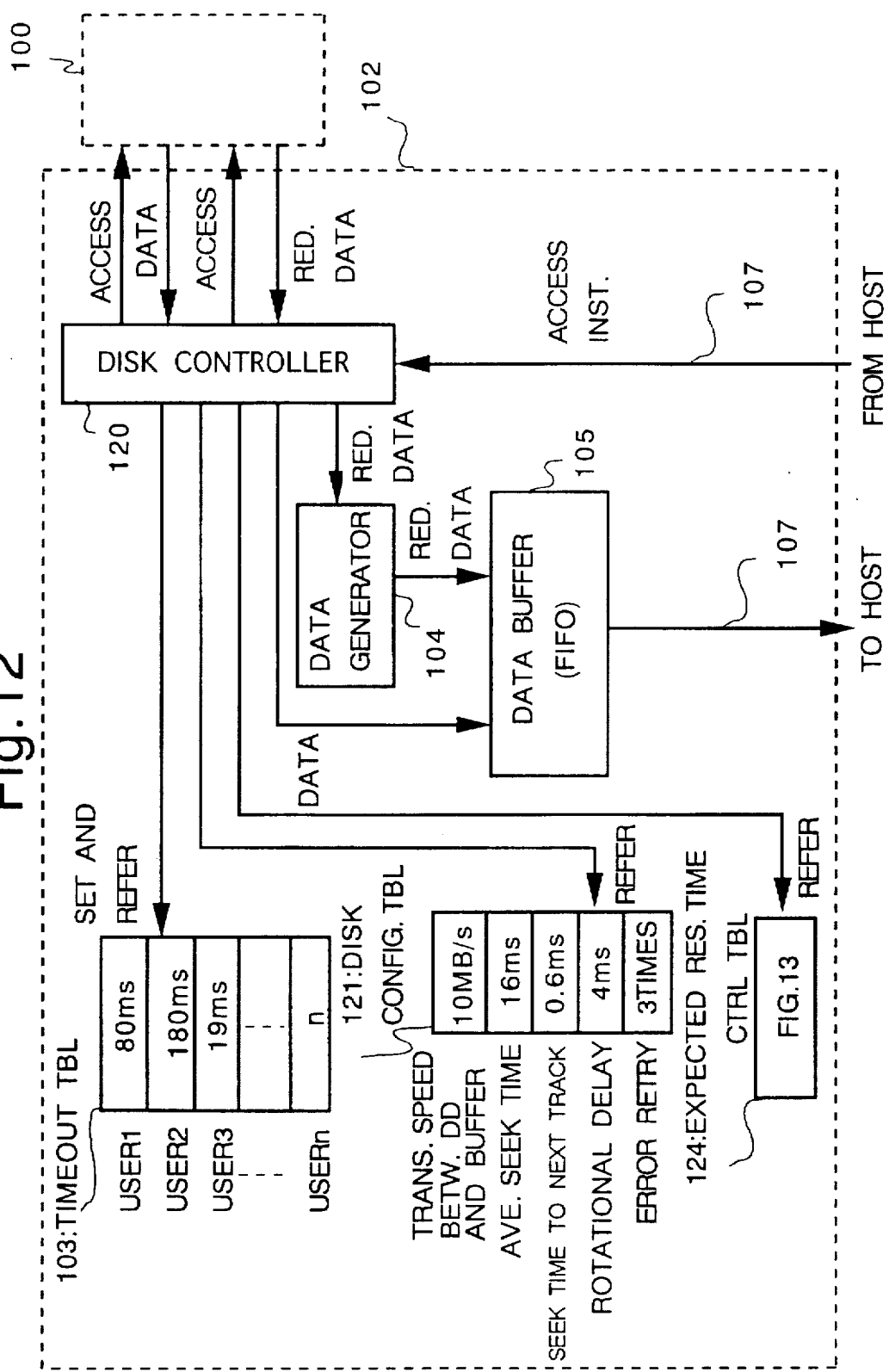
Figure 14:
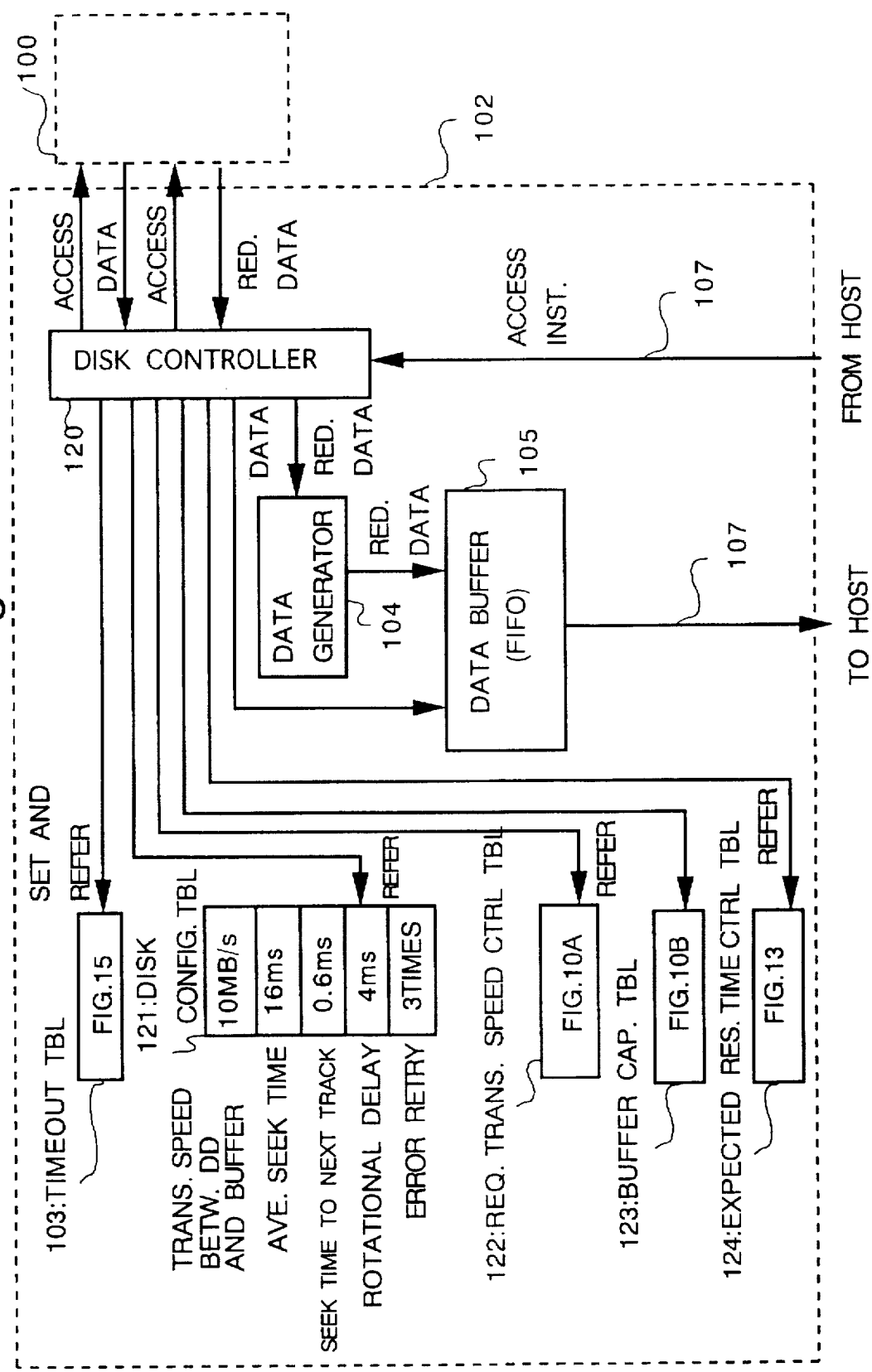
Figure 16:
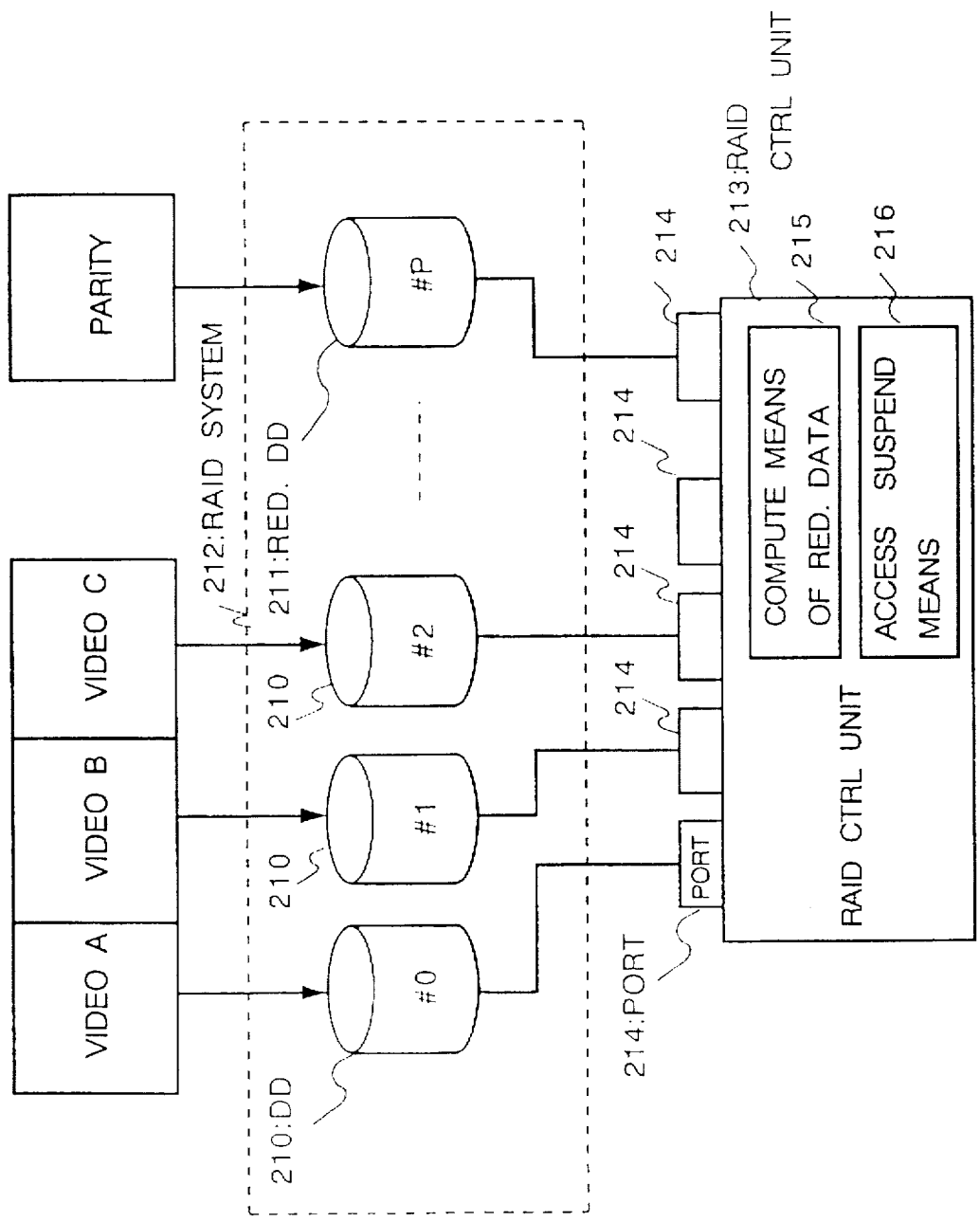
Figure 20:
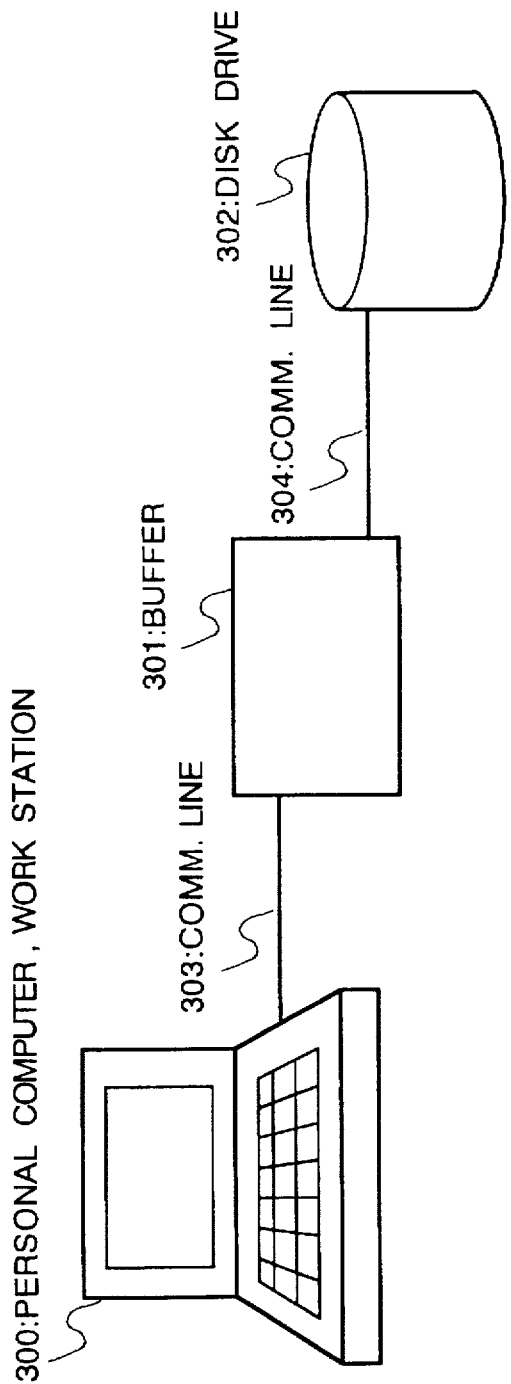
Figure 21:
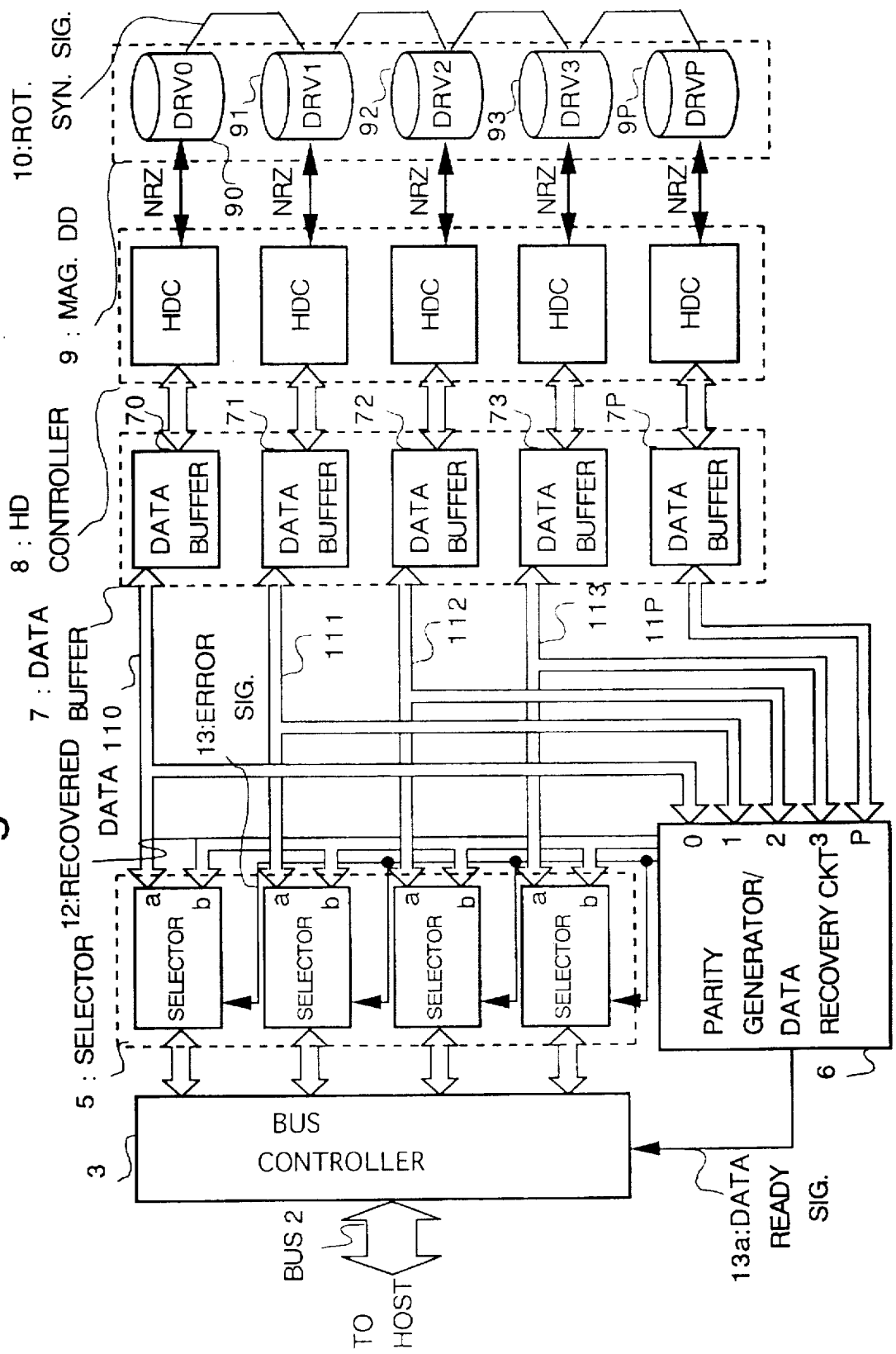
Figure 22:
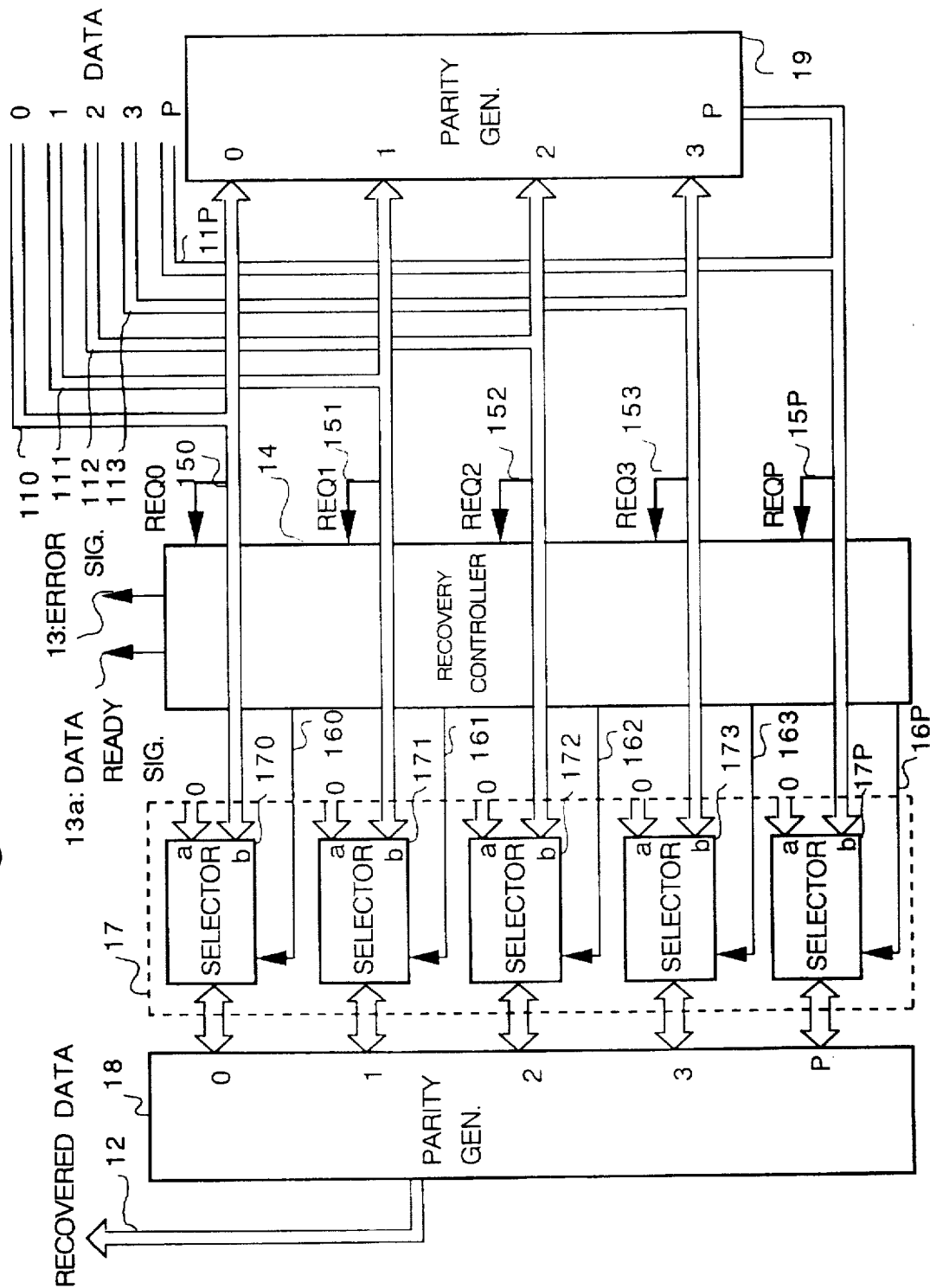
Figure 23:
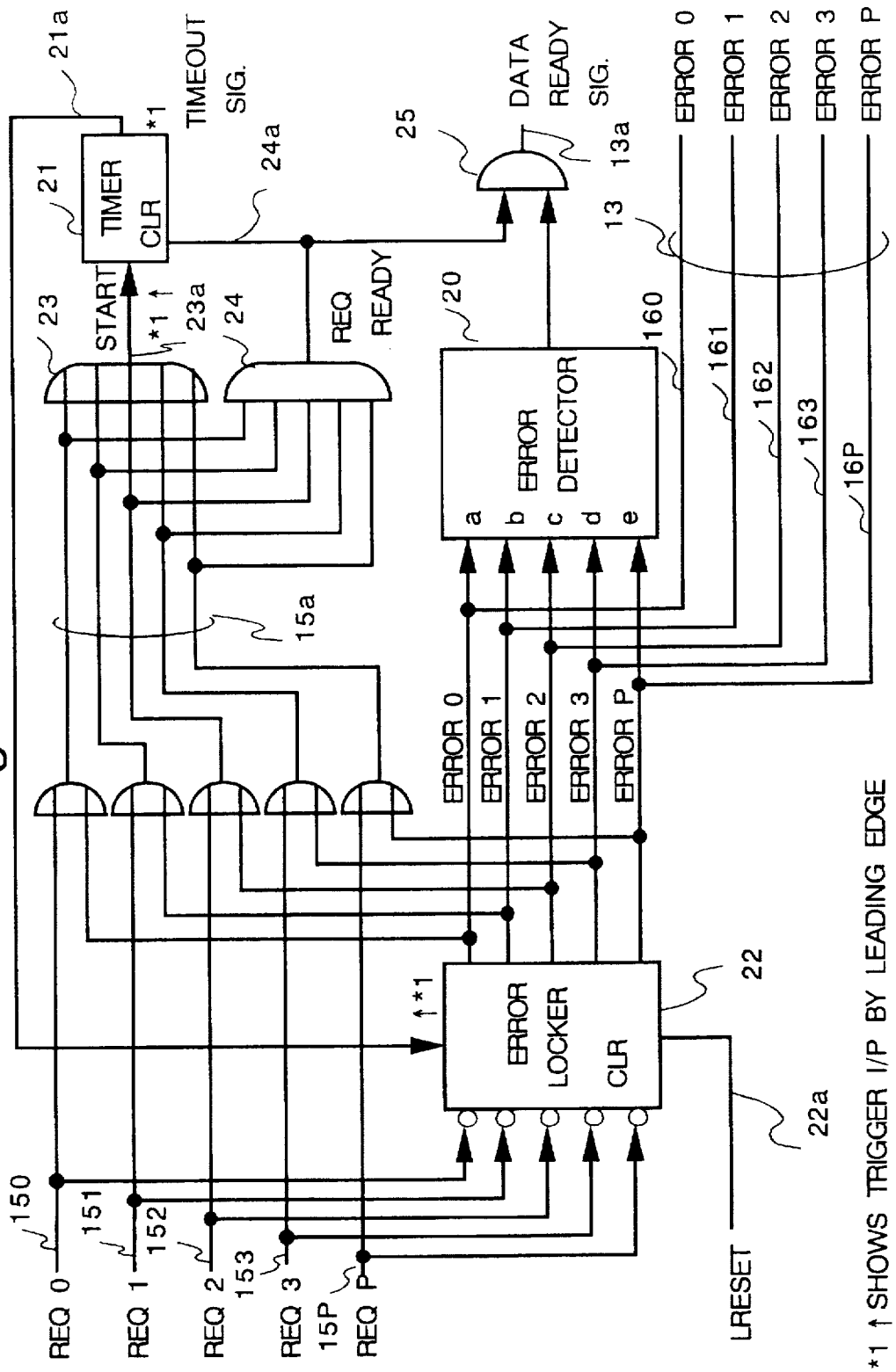
Figure 24:
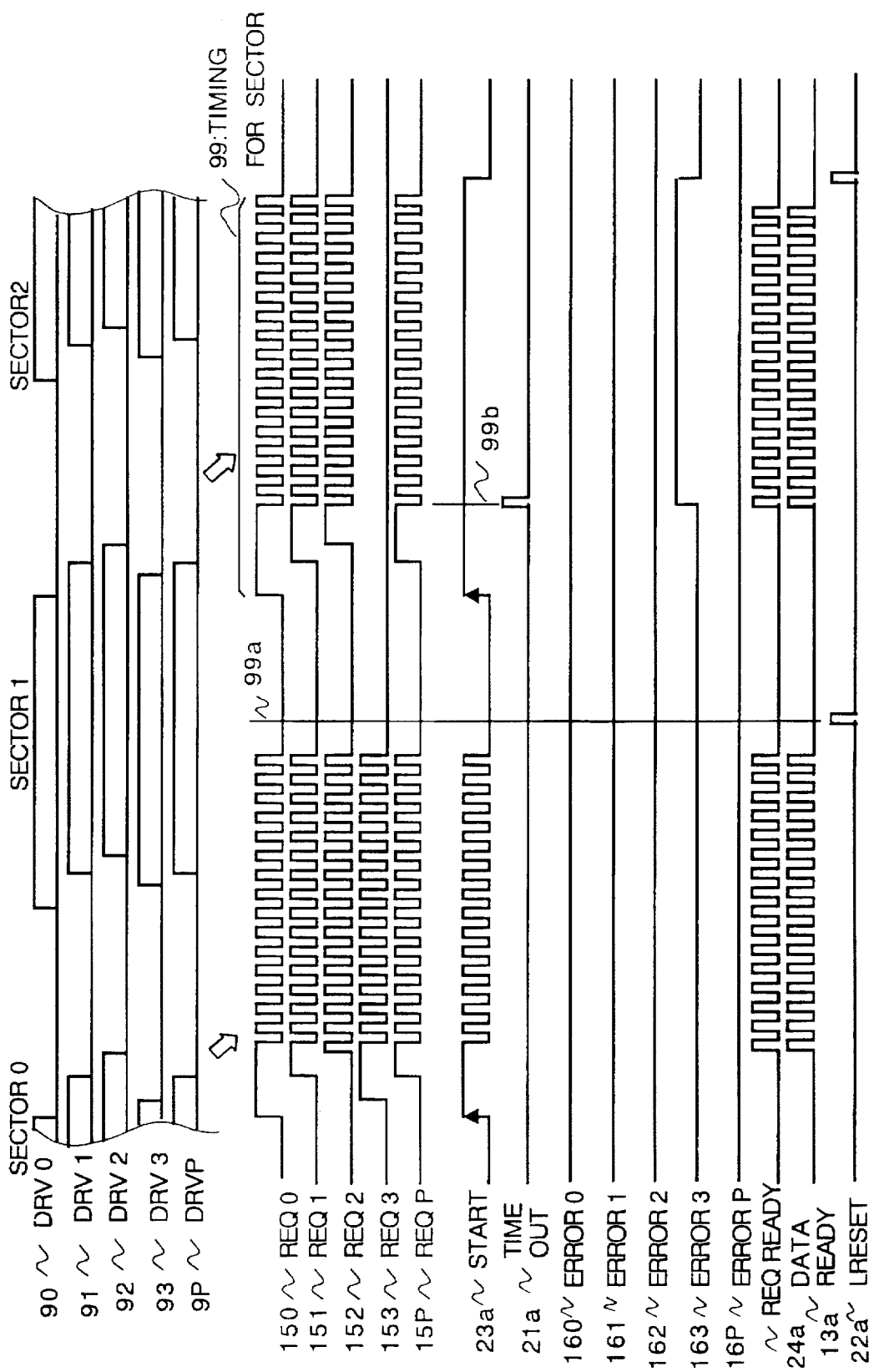
Figure 25:
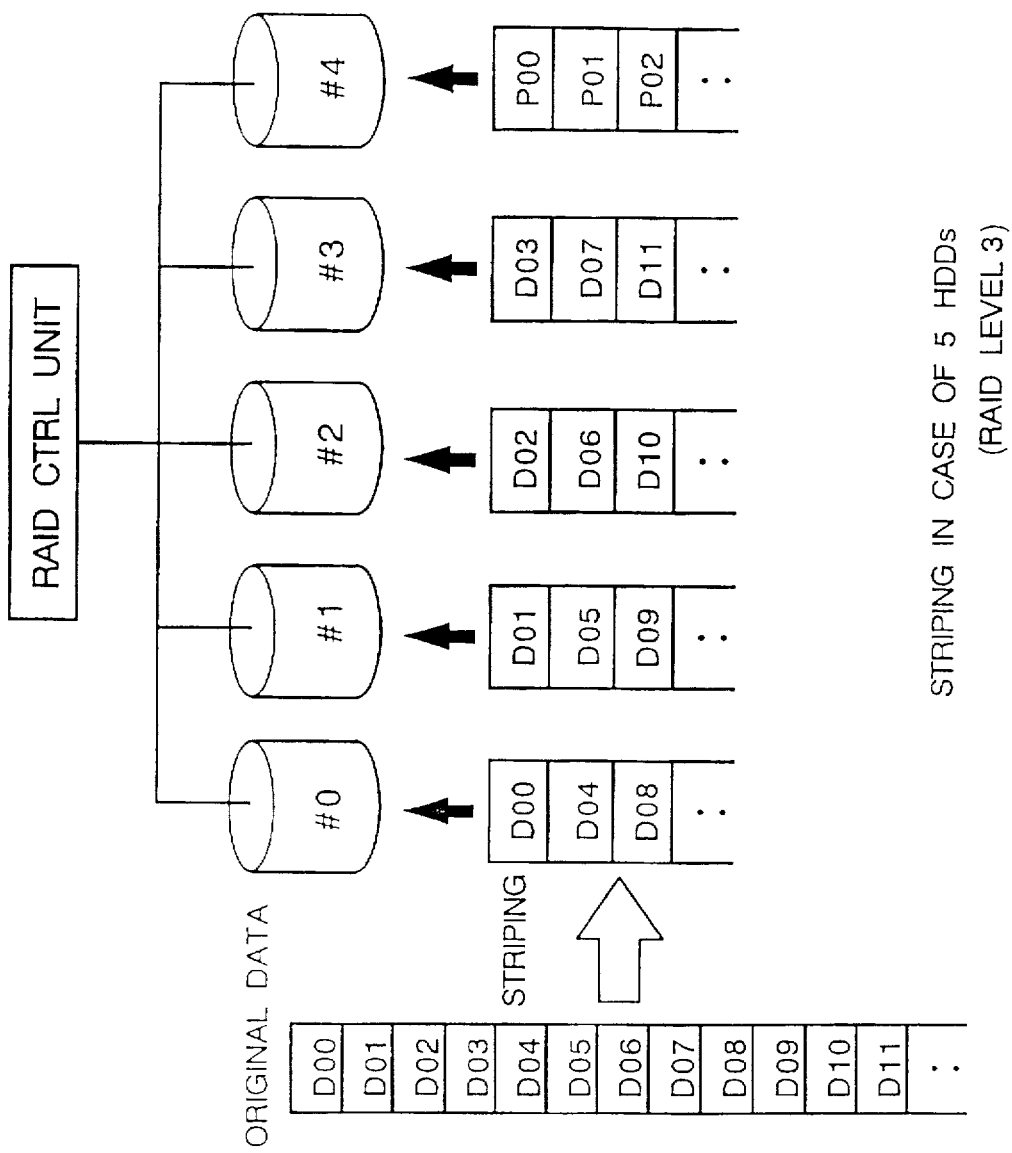
Figure 26:
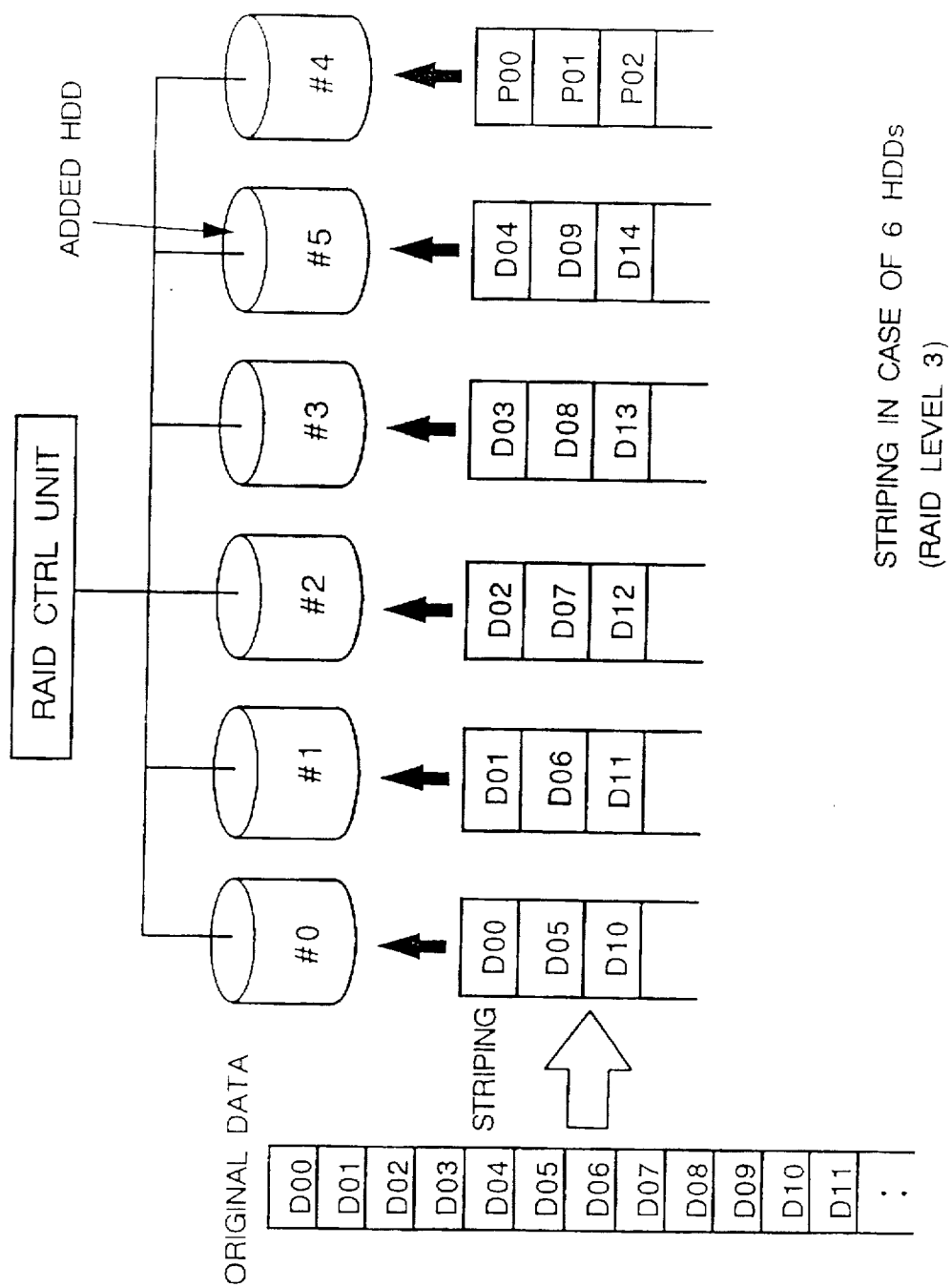

Each of FIGS. 10A, 10B, 10C and 10D shows each table included in the control unit of FIG. 9;

FIG. 11 shows the timeout table of the system of FIG. 9;

FIG. 12 shows an operation of another multi-media storage system, where an expected response time control table is included in the control unit of FIG. 1, according to a fourth embodiment of the present invention;

FIG. 13 shows the expected response time control table of FIG. 12;

FIG. 14 shows a configuration of another multi-media storage system, where a requested transmitting speed control table and an expected response time control table are included in the control unit of FIG. 1, according to a fifth embodiment of the present invention;

FIG. 15 shows a timeout table of the system of FIG. 14;

FIG. 16 shows another system configuration of a multi-media storage system according to a sixth embodiment of the present invention;

FIG. 17 explains how to generate new parity data;

FIG. 18A shows a system configuration including four disk drives connected to a RAID control unit;

FIG. 18B shows the system configuration of FIG. 18A, where a new disk drive is added;

FIG. 19A explains an operation of generating a new parity in a system configuration including a compute means of redundant data outside of the RAID control unit;

FIG. 19B shows a system configuration, where a parity disk drive is exchanged;

FIG. 20 shows a conventional storage system, where a large amount of data is serially transmitted;

FIG. 21 is a block diagram of one embodiment of a conventional transmitting system and transmitting device of parallel data;

FIG. 22 is a block diagram of a parity generatordata recovery circuit of the system of FIG. 21;

FIG. 23 shows a circuit configuration of a recovery controller of the circuit of FIG. 22;

FIG. 24 is a timing chart explaining an operation of the circuit of FIG. 23;

FIG. 25 shows data storing status in RAID level 3 according to one of the related arts; and FIG. 26 shows data storing status in the system of FIG. 25, where a new disk drive is added.

DESCRIPTION OF THE PREFERRED EMBODIMENT

Embodiment 1

According to one embodiment of the present invention, data is distributed and stored in a plurality of disk drives in a multi-media storage system. Data transmission can be continued even when an internal calibration occurs, or when an error occurs in one of the disk drives. In such a case, when any response is not received within a predetermined expected response time, the access to the faulty disk drive is cancelled. The required data can be obtained from the other disk drives of the system, which thus allows data transmission to continue.

FIG. 1 is an example of a multi-media storage system according to a first embodiment of the present invention.

In FIG. 1, a host system 130 connects a multi-media storage device 106 and users 108 which can be client terminals. The multi-media storage 106 includes a control unit 102, a storage 100 and a data buffer 105. The storage 100 stores data in a mirror configuration. In the storage 100, a disk drive 100a stores data and a disk drive 100b stores redundant data. The control unit 102 accesses the disk drive 100a to read data by receiving an instruction from the user 108. A timeout table 103 is provided for showing expected response time based on a transmission speed of consecutive data transmissions and on a maximum response time requested by each user 108. The control unit 102 observes whether the disk drive responds to the access within the expected response time predetermined by each user. If there is no response within the expected response time, a data generator 104 obtains the redundant data from the disk drive 100b. The control unit 102 stores the accessed data in the data buffer 105. The control unit 102 stores the redundant data in the data buffer 105 when the accessed disk drive does not respond within the expected response time. The data is then transmitted to the host system 130 from the data buffer 105.

Figure 2:
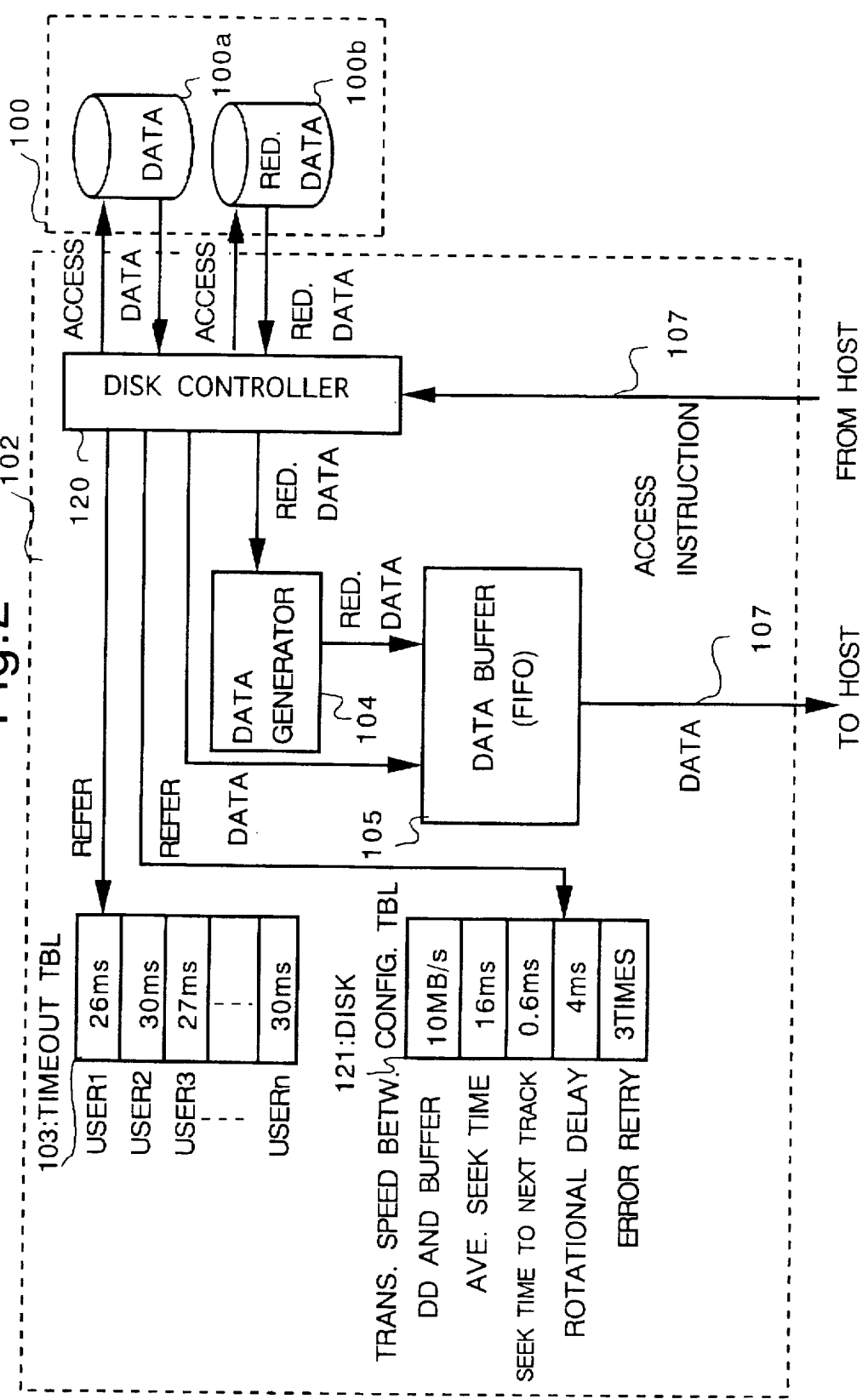
FIG. 2 shows an operation of a control unit of the system configuration of FIG. 1.

FIG. 2 shows an operation of the control unit 102 of the system shown in FIG. 1.

In FIG. 2, the control unit 102 includes the timeout table 103 which stores the expected response time for each user. The control unit 102 also includes a disk configuration table 121, which is not shown in FIG. 1. The disk configuration table 121 stores the data transmission speed between the disk drive and the buffer, the average seek time, the read time per track, the rotational delay, and the number of error retries. The control unit 102 includes only one disk configuration table 121 set with configuration values for two disk drives of the same configuration. The expected response time is set in the timeout table 103 according to a transmission speed of consecutive data transmissions or a maximum response time requested by each user of the multi-media storage system of the present invention. When not specified, 30 ms is set as the expected response time for a user in the timeout table 103.

Figure 3:
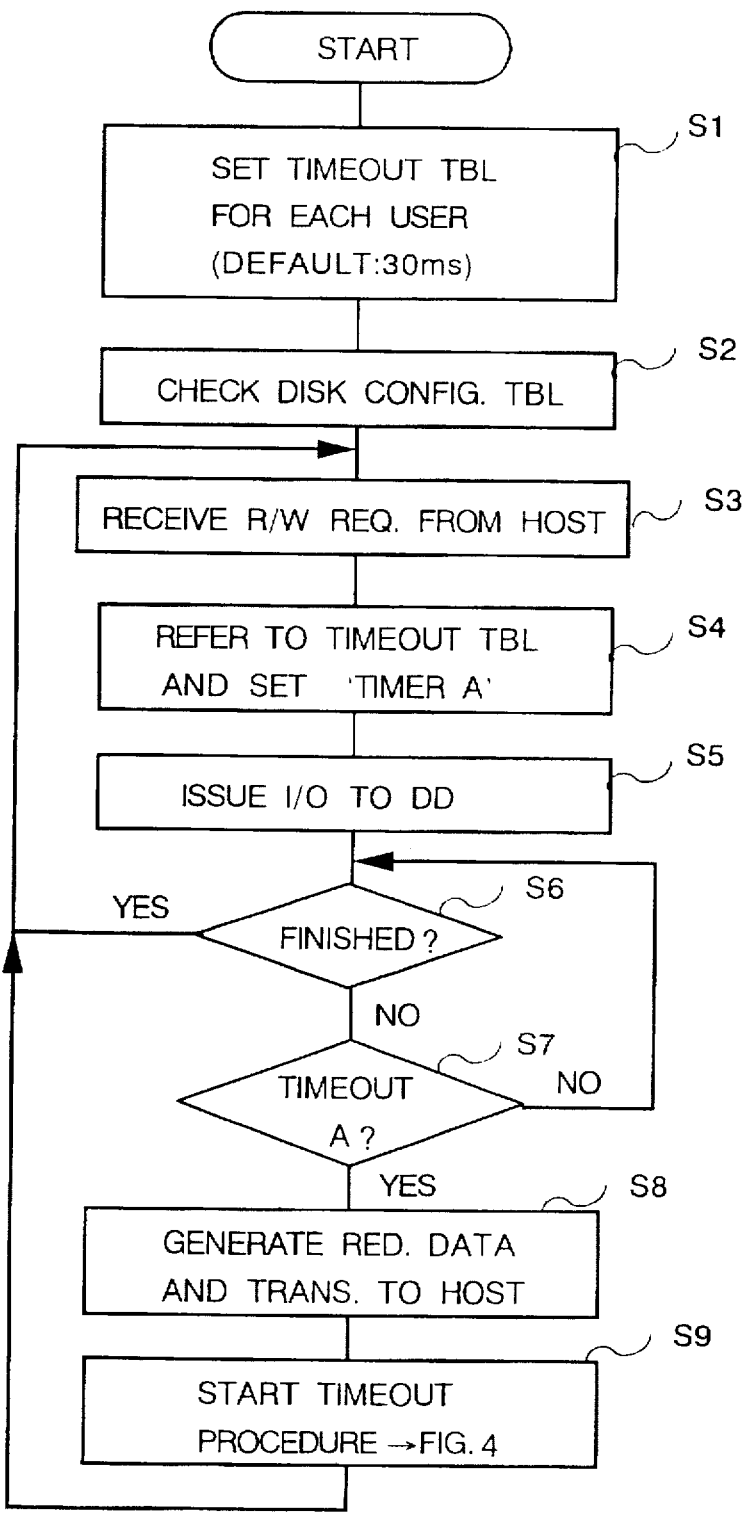
FIG. 3 is a flowchart showing a reading procedure of data in the multi-media storage system.

FIG. 3 is a flowchart showing a reading procedure of data in the multi-media storage system according to the first embodiment of the present invention.

Figure 4:
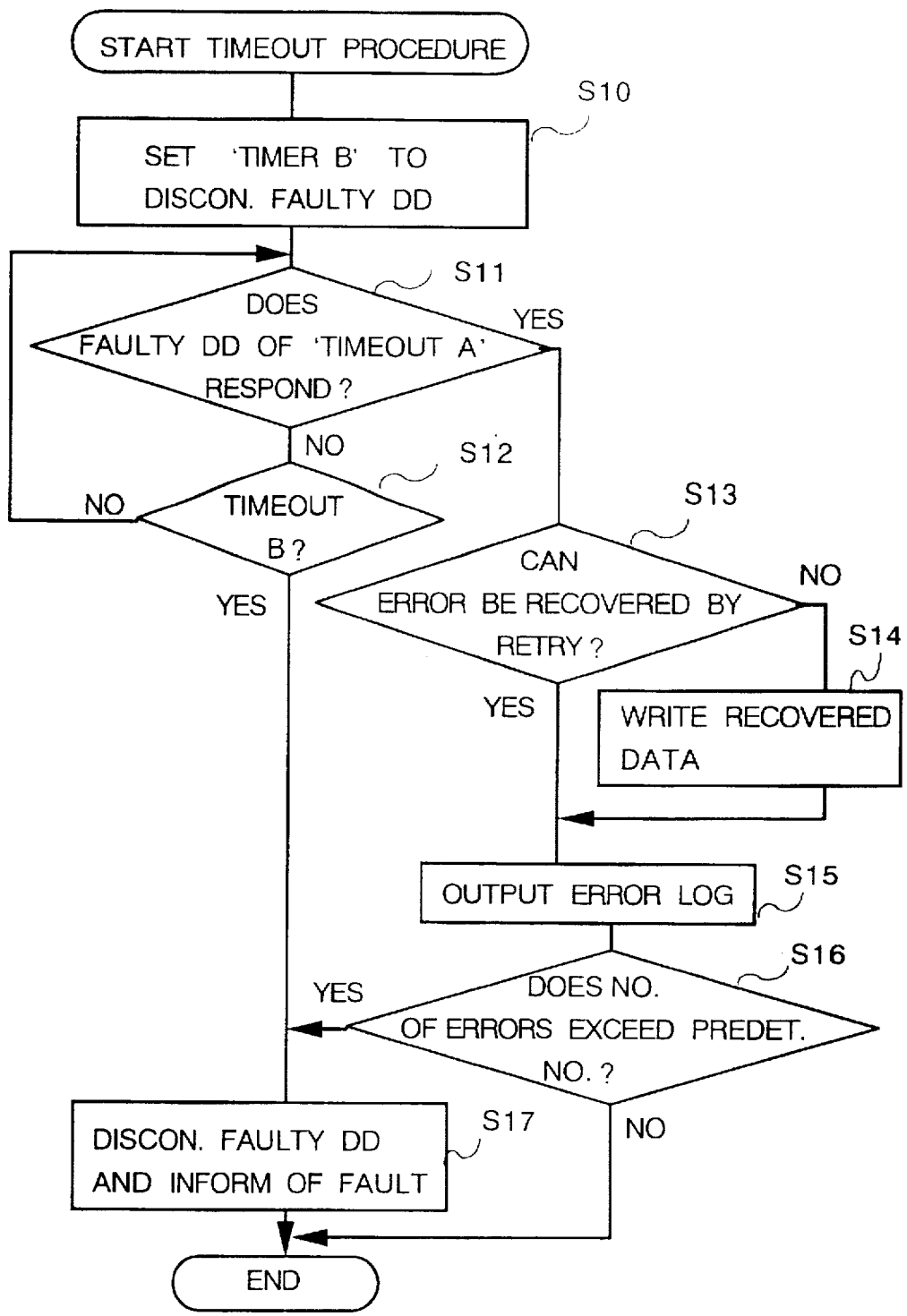
FIG. 4 is a flowchart showing a timeout procedure of step S9 in the flowchart of FIG. 3.

FIG. 4 is a flowchart showing a timeout procedure of step S9 in the flowchart of FIG. 3.

The following explains a reading procedure of data in the multi-media storage system referring to FIGS. 1, 2 3 and 4.

Before a user accesses the multi-media storage system, the expected response time is set by the user in the timeout table 103 according to a transmission speed of consecutive data transmissions or a maximum response time required by each user. When the user wants to change the expected response time already set for the user, a new response time should be input to update the timeout table 103 (see step S1 in FIG. 3).

A default value of the expected response time is 30 ms in the multi-media storage system.

A disk controller 120 confirms that each value is properly set in the disk configuration table 121 (see step S2). Without the information of the disk configuration table 121, it is impossible to check whether the expected response time in the timeout table 103 is valid or not. Furthermore, according to a third embodiment of the present invention, which is described later, the expected response time is set automatically in the timeout table 103 by calculating the values stored in the disk configuration table 121. The validity of the expected response time can be checked by the same calculation procedure for calculating the expected response time which is described in the second embodiment. In any case, the information should thus be set in the disk configuration table 121 previously.

In the control unit 102, the timeout table 103 and the disk configuration table 121 are located in non-volatile memory such as an EEPROM (electrically erasable programmable ROM (read only memory)) or a disk system area.

The disk controller 120 checks the expected response time set in the timeout table 103 based on the information in the disk configuration table 121 (see step S2). If the expected response time is not valid, the disk controller 120 displays a warning message to the user (this is not shown in FIG. 3). When the expected response time of the timeout table 103 is valid, the control unit 102 waits for a Read/Write instruction from the host system 130. On receiving a Read/Write instruction (see step S3), the disk controller 120 sets a "timer A" to the expected response time corresponding to the user by referring to the timeout table 103 (see step S4). The disk controller 120 issues an I/O (Input/Output) instruction to the disk drive 100a (see step S5). After issuing the I/O instruction, the disk controller 120 observes the response time from the disk drive 100a. If the disk drive 100a responds within the expected response time set in the "timer A" (see step S6), in the case of a Read instruction, the disk controller 120 stores the data which was read from the disk drive 100a into the data buffer 105. In the case of Write instruction, the disk controller 120 writes the data which was read from the data buffer 105 onto the disk drive 100a. Then the disk controller 120 waits for further Read/Write instructions from the host system. On the contrary, in the event that the disk drive 100a does not respond within the expected response time set in the "timer A" (this state is called "timeout A")(see step S7), in the case of a Read instruction, the disk controller 120 instructs the data generator 104 to read the redundant data. The data generator 104 accesses the disk drive 100b to read the redundant data stored in the disk drive 100b.

In the multi-media storage system shown in FIG. 1, data is stored in a mirror configuration. In the event of a delay or error, data can be obtained by reading redundant data stored in the disk drive 100b, even if data cannot be read at the original Read instruction. The data generator 104 stores the read redundant data in the data buffer 105. The data buffer 105 transfers the obtained redundant data to the host system (see step S8). Then, the data generator 104 starts a timeout procedure shown in FIG. 4 (see step S9 in FIG. 3). After finishing the timeout procedure, the control unit 102 waits for another Read/Write request from the host system.

The following explains the timeout procedure referring to the flowchart of FIG. 4.

When the disk drive 100a does not respond within the expected response time set in the "timer A", the disk controller 120 sets a "timer B" to disconnect the disk drive 100a (see step S10 in FIG. 4). The "timer B" determines the time limit for waiting for a response from a faulty disk drive. A predetermined value is set in the "timer B" previously in the system. In this example, 200 ms is set in the "timer B" as an error retry time. The disk controller 120 observes whether the faulty disk drive responds or not within the 200 ms time limit set in the "timer B" (see steps S11 and S12). If the faulty disk drive does not respond within 200 ms (this state is called a "timeout B"), then the disk controller disconnects the faulty disk drive and informs the host system of the fault (see step S17).

When the faulty disk drive 100a responds within 200 ms, it is determined whether the data of the faulty disk drive 100a can be recovered by a retry function of the disk drive or not by checking the response from the faulty disk drive 100a (see step S13). If the data can be recovered by the retry function, the disk controller 120 outputs the error to an error log (see step S15). The error log is stored in an error managing area (this is not shown in the figure) of the control unit 102. If the data cannot be recovered by the retry function, the disk controller 120 writes data obtained from the redundant data of the disk drive 100b into the faulty disk drive 100a to recover the data (see step S14). Then, the disk controller 120 outputs the error to the error log (see step S15). The disk controller checks the number of the errors recorded in the error log. If the number of the errors exceeds a predetermined number of the errors specified in the system, the faulty disk drive 100a is disconnected from the system and the fault is informed to the host system 130 (see step S17). The above predetermined number of errors is specified as a maximum number of errors in the whole system for system reliability. When the number of errors exceeds the maximum, a faulty disk element is disconnected. If the number of the errors is within the predetermined number, the timeout procedure is finished.

The predetermined number of errors as a limit is provided for system reliability, and it is not always required to embody the present invention.

In the above example, the disk controller starts an access to the redundant disk drive after detecting the timeout of the "timer A". The access to the redundant disk drive can be executed previously, before the timeout of the "timer A".

The data obtained from the disk drive 100a is the same as the data obtained from the disk drive 100b because the storage 100 is configured as a mirror configuration. The disk controller 120 stores data obtained from the disk drive, which responds faster, in the data buffer 105. For example, in the case that two disk drives 100a and 100b are accessed simultaneously, if the disk drive 100b responds earlier than the disk drive 100a, then data is obtained from the disk drive 100b to store in the data buffer 105.

The storage 100 is used by a plurality of users connected to the host system 130. Accordingly, when a plurality of users accesses the storage 100 simultaneously, some of the plurality of users have to wait for access. However, this status can be avoided by predetermining a priority of the users to access a specific disk drive. The user 1, for example, is predetermined to have priority to access the disk drive 100a and the user 2 is predetermined to have priority to access the disk drive 100b. The disk controller 120 accesses disk drive 100a by receiving a Read instruction from the user 1 prior to the instruction from the user 2 even if the users 1 and 2 access the disk drive 100a simultaneously. The disk controller 120 accesses the disk drive 100b to obtain the redundant data when the disk drive 100a does not respond within the expected response time. On the other hand, on receiving a Read instruction from the user 2, the disk controller 120 accesses the disk drive 100b prior to the disk drive 100a. The disk controller 120 accesses the disk drive 100a to obtain the data when the disk drive 100b does not respond within the expected response time.

In another way to avoid a waiting status of disk access, the disk controller 120 can determine which disk drive to access by checking the accessing status of both disk drives 100a and 100b. For example, the disk controller 120 accesses the disk drive 100b to obtain the redundant data if the disk drive 100a is being accessed. The disk controller 120 thus can respond quickly to the access request from the user.

As has been described, if the disk drive does not respond within the expected response time, the data generator of the storage system of the present invention reads the redundant data from the redundant disk drive to satisfy the continuous data transmission to the host system 130. The data generator also recovers the data automatically by the retry function of the faulty disk drive in case that the data of the faulty disk drive can be recovered by the retry function. In case that the data cannot be recovered by the retry function of the faulty disk drive, the redundant data read from the redundant disk drive is written into the faulty disk drive to restore the faulty data. The corrupted error data can be recovered immediately by accessing the disk drive storing the data and the disk drive storing the redundant data simultaneously.

In the above explanation, the case of a Read request for data was explained. In the case of a Write request of data, the data received from the host system 130 is written in the disk drive 100b for storing the redundant data in step S8 in FIG. 3, instead of generating the redundant data to transfer to the host system. In the timeout procedure of the flowchart shown in FIG. 4, the data received from the host system 130 is written in the disk drive 100a, instead of writing the recovered data at step S14. The other steps of the procedure are the same as the above case of a Read request of data.

Embodiment 2

In a second embodiment of the present invention, the disk configuration is a RAID configuration. The following is an operation of the data generator.

Figure 5:
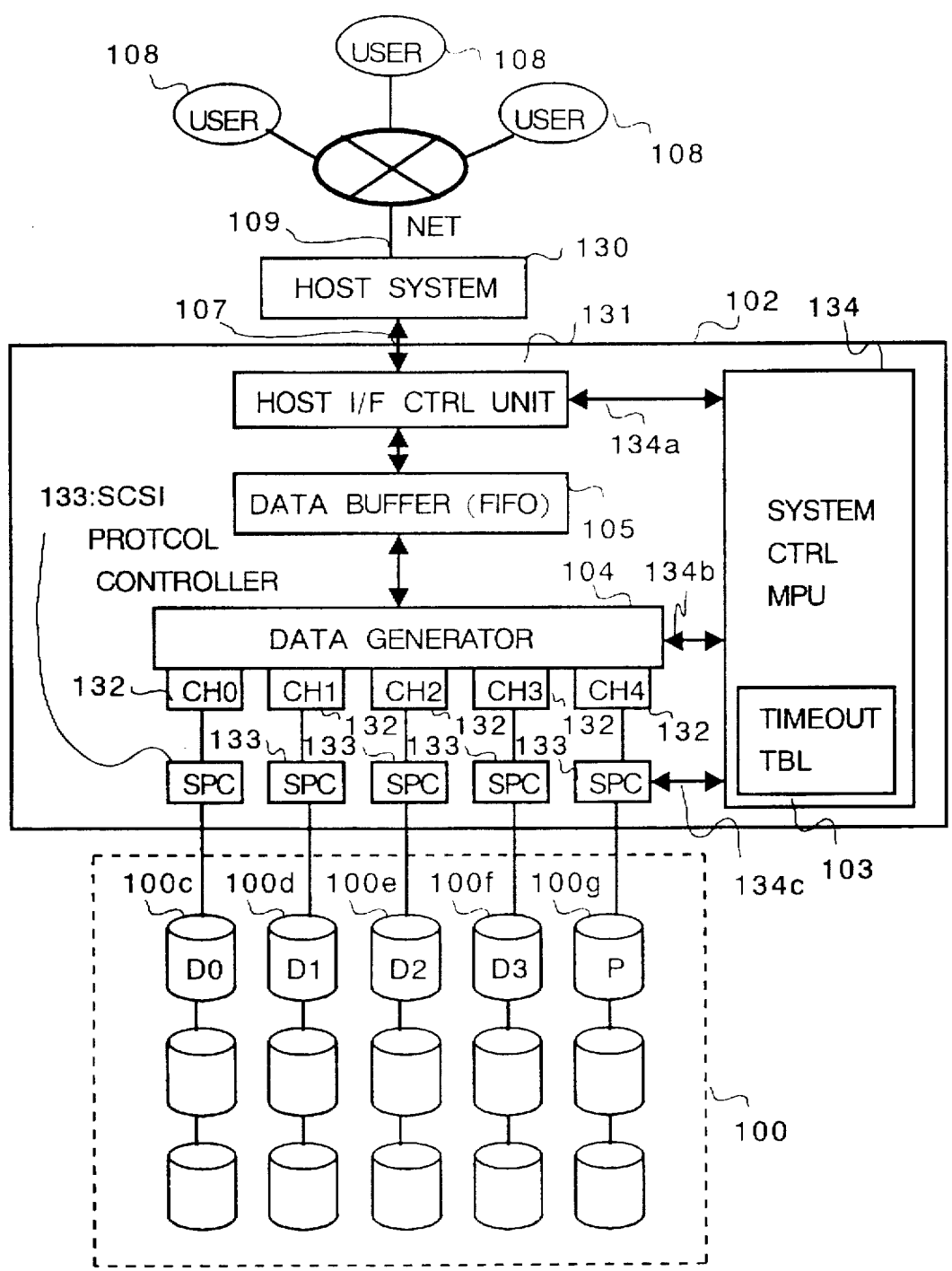
FIG. 5 shows another example a multi-media storage system according to a second embodiment of the present invention.

FIG. 5 shows an example of a system configuration of the multi-media storage system according to the second embodiment of the invention.

In FIG. 5, the host system 130 connects a plurality of the users 108 via a communication line 109. The host system 130 also connects the control unit 102 via a communication line 107. The control unit 102 is connected to the storage 100 of a RAID configuration. The disk configuration is RAID level 4 and includes five disk drives in horizontal direction, and three disk drives in vertical direction. A disk drive 100g stores redundant data. SCSI Protocol Controller (SPC) 133 connects the storage 100 and the data generator 104. The data generator 104 includes five channels 132, CH0–CH4. The data buffer 105 connects a host IF (interface) control unit 131 and the data generator 104. The data buffer 105 stores data for writing which is transmitted from the host system 130 or data read by the data generator 104. The data buffer 105 has a FIFO (First-In/First-Out) configuration. A system control MPU (Micro-Processing Unit) 134 receives and interprets an access instruction received from the host system 130 via the host I/F control unit 131. The system control MPU 134 also responds to the host I/F control unit 131 to inform the host I/F control unit of completion of interpreting the access instruction. The system control MPU 134 instructs the data generator 104 to switch channels or the disk drive to store the recovered data. The system control MPU 134 instructs the SPC 133 to issue I/O instructions and receives a signal informing completion of operation. The system control MPU 134 also includes the timeout table 103 for storing expected response times for each user.

FIG. 6 shows a circuit configuration of the data generator 104 of FIG. 5.

In FIG. 6, a switch 135 switches lines to input data from the data recovery circuit 137 in the case that the disk drive, which receives the I/O instruction, does not respond within the expected response time. The buffers 136 store data input from the disk drives 100c–100g. A switch 138 switches among the five channels 132 CH0–CH4 based on the switching instruction from the system control MPU 134. The data recovery circuit 137 recovers data based on the data received from the buffer 136 and transmits the recovered data to one of the buffers 136 which corresponds to the faulty disk drive.

FIG. 7A shows the timeout table 103 of the system of FIG. 5. FIG. 7B shows the disk configuration table 121 of the system of FIG. 5.

The timeout table 103 and the disk configuration table 121 are stored in the system control MPU 134.

In the system configuration of FIG. 5, the disk configuration table is, for example, set as shown in FIG. 7B. As an example, a user 1 will access the data stored in the storage 100 via the host system 130. The procedure will be explained referring to the flowchart of FIG. 3.

The user 1 in FIG. 7A sets the expected response time to "22 ms" in the timeout table 103 (see step S1). The expected response time quantifies a period from the start of the access from the system control MPU 134 to the disk drives 100c–100g, until the end of the data transfer from the disk drives 100c–100g to the data buffer 105. The control unit 102 checks whether the expected response time set at step S1 is valid or not (see step S2). In this example, the four disk drives 100c–100f transmit data of 60 KB in total. Each of the four disk drives 100c–100f stores the requested data in one track. The disk is configured as shown in the disk configuration table 121 of FIG. 7B. The transmitting speed between one disk drive and the data buffer is 10 MB/s. In the case of providing four disk drives, data can be transmitted at a speed of "10 MB/s*4 (disk drives)" between the disk drives and the data buffer, assuming the requested data is not stored in a next track, and the track is accessed at random. A valid maximum consecutive transmitting time between the disk drives 100c, 100d, 100e and 100f and the data buffer 105 including the seek time is obtained by the following expression:

$$60 \text{ KB}/(10 \text{ MB/s}*4 \text{ disk drives})+16 \text{ ms}+4 \text{ ms}=21.5 \text{ ms}$$

where 16 ms is the average seek time, and 4 ms is the rotational delay time as shown in FIG. 7B.

If the requested data is stored in the next track and is accessed sequentially, only the next track is required to be sought and the maximum consecutive transmitting time is as follows:

$$60 \text{ KB}/(10 \text{ MB/s}*4 \text{ disk drives})+0.6 \text{ ms}=2.1 \text{ ms}$$

where 0.6 ms is the seek time to next track as shown in FIG. 7B.

The above values are within the expected response time "22 ms" set by the user 1, thus the expected response time "22 ms" is determined to be valid.

In the disk configuration table of FIGS. 2 and 7B the average seek time and the seek time to next track are stored. These times are for reading data. There are two kinds of disk drives: a disk drive where a seek time for reading data is the same as a seek time for writing data; and a disk drive where a seek time for reading data is different from a seek time for writing data. In this embodiment, either type of the disk drives can be used as long as the disk configuration table 121 stores the seek time for reading data.

In FIG. 5, the control unit 102 receives Read/Write requests from the user 1 via the host system 130 (see step S3). The host I/F control unit 131 transfers the Read/Write request from the host system 130 to the system control MPU 134. The system control MPU interprets the received request and informs the host I/F control unit 131 of completion of interpreting the received request. The host I/F control unit 131 transmit/receives information to from the system control MPU 134 via a line 134a.

The system control MPU 134 obtains "22 ms" from the timeout table 103 of FIG. 7A as the expected response time of the user 1 and sets "timer A" to "22 ms" (see step S4). The system control MPU 134 instructs the data generator 104 to switch the channels. The data generator 104 sets the switch 138 in FIG. 6 to disconnect the disk drive 100g, which stores parity, via the line 134b. The system control MPU 134 instructs the SPC 133 to issue an I/O instruction to the disk drive storing the requested data via the line 134c (see step S5 in FIG. 3). The SPC 133 reads data from the disk drives 100c–100f based on the I/O instruction from the system control MPU 134. The SPC 133 will inform the system control MPU 134 of completion of reading via the line 133c. The system control MPU 134 starts a "timer A" and waits for completion of reading by the SPC 133 after instructing the SPC 133 to issue the I/O instruction. When the system control MPU 134 is informed of the completion of reading by the SPC 133 within the expected response time set as "timer A", the system control MPU 134 waits for further Read/Write requests from the host system 130 (see step S6 in FIG. 3). When the system control MPU 134 is not informed of the completion of reading by the SPC 133 within the expiration of "timer A" (this state is called "timeout A")(see step S7 in FIG. 3), the system control MPU 134 obtains the redundant data from the disk drive 100g (see step S8 in FIG. 3). If an error occurs in the disk drive 100c, for example, the data will not be read from the disk drive 100c. The system control MPU 134 instructs the data generator 104 to generate data from the redundant data via the line 134b. On receiving the generate instruction, the data generator 104 sets the switch 138 to disconnect the faulty disk drive 100c and to connect the disk drive 100g storing the parity. The data generator 104 then recovers the data, which was required to be read from the disk drive 100c, based on the data read from the disk drives 100d–100g, by the data recovery circuit 137.

The following explains the data recovery system using the redundant data referring to FIG. 8 and FIGS. 5 and 6.

The disk drive 100c stores data D0, the disk drive 100d stores data D1, the disk drive 100e stores data D2, the disk drive 100f stores data D3, and the disk drive 100g stores the redundant data DP, respectively. "0" is obtained by an exclusive OR logic operation of these data as shown in FIG. 8A. Accordingly, even if the disk drive 100c becomes faulty, the data D0 stored in the disk drive 100c is obtained by the expression shown in FIG. 8B. The data generator 104 resets the switch 135 connected to the disk drive 100c, which is originally set to input the data from the disk drive 100c, to now input the recovered data from the data recovery circuit 137 and output the recovered data to the one of the buffers 136 corresponding to the disk drive 100c. Then the data generator 104 sets the switch 138 to disconnect the disk drive 100c and to input the data from the disk drive 100g. Accordingly, the data generator 104 transmits the data read from the disk drives 100d–100f and the recovered data to the data buffer 105. The host I/F control unit 131 informs the system control MPU 134 of the completion of the reading of the data via the line 134a. The data is transmitted from the data buffer 105 to the host system 130 via the host I/F control unit 131 (see step S8 in FIG. 3). The data generator 104 starts the timeout procedure as shown in the flowchart of FIG. 4 (see step S9 in FIG. 3). The control unit 102 then waits for another Read/Write request from the host system 130.

The following explains the timeout procedure referring to the flowchart of FIG. 4 and FIGS. 5–8.

The system control MPU 134 instructs the data generator 104 to disconnect the faulty disk drive 100c. The system control MPU 134 sets "timer B". In this embodiment, "200 ms" is set as "timer B". "Timer B" is set in the system to allow a maximum time limit for waiting for the response from the faulty disk drive. The system control MPU 134 waits for the response from the disk drive 100c until the predetermined time in "timer B" has passed (see steps S11 and S12). If the disk drive 100c does not respond within "timer B" (this state is called "timeout B"), the system control MPU 134 informs the user 1 of the fault, via the host system 130. The system control MPU 134 also informs the operator observing the system of the fault (see step S17).

If the disk drive 100c responds within "timer B", it is checked whether or not the faulted data can be recovered by the retry function of the faulty disk drive 100c (see step S13). If the faulted data can be recovered by the retry function, the system control MPU 134 outputs an error log message to an error managing area (see step S15). The error managing area is provided either in the system control MPU 134 or in the control unit 102. If the faulted data cannot be recovered by the retry function, the system control MPU 134 instructs the SPC 133 to write the data, which is recovered by the data recovery circuit 137 and stored in the buffer 136, into the disk drive 100c. The SPC 133 writes the recovered data into the disk drive 100c to update the data (see step S14). The system control MPU 134 outputs an error log message to an error managing area (see step S15). The system control MPU 134 checks whether the number of error messages exceeds the predetermined number of allowable errors. The predetermined number is provided to limit the number of error messages recorded in the error log in the whole system for system reliability. If the number of error messages exceeds the predetermined number, the system does not execute the error retry function any more and the faulty disk drive is disconnected. In the above example, when the number of error messages exceeds the predetermined number, the faulty disk drive 100c is disconnected and the fault is informed to the host system 130 (see step S17).

The above predetermined number of error messages is provided for system reliability and is not always required to embody the present invention.

As described above, the system is configured by the RAID configuration in this embodiment. The expected response time can be set for each user in the RAID configuration of this embodiment as well as in Embodiment 1. The required data can be provided to the user within the expected response time set previously. Even if a disk drive becomes faulty, the required data can be recovered by the data stored in the other disk drives.

In this embodiment, the storage 100 is configured by RAID configuration and the system control MPU 134 controls access to each of the disk drives 100c–100f. Namely, the system control MPU 134 decides which disk drive among the five disk drives 100c–100g should be accessed when the host system accesses the data stored in the storage 100. Accordingly, the function of the system control MPU 134 may be customized in order to obtain the redundant data simultaneously with the data. When the disk drive which is accessed to read data becomes faulty, the faulted data cannot be generated only by obtaining the redundant data. While in Embodiment 1 of the present invention, since the storage 100 is a mirror configuration, the required data can be obtained by either the data stored in the disk drive 100a or the redundant data stored in the disk drive 100b. The required data is read from whichever disk drive which responds before the other of the two disk drives 100a and 100b. In this embodiment, when the disk drive 100c, for example, becomes faulty, the data stored in the disk drive 100c should be recovered based on the data stored in the disk drives 100d–100g.

When a plurality of users are connected to the host system 130 as shown in FIG. 5, there may be a case where no available buffer capacity in the data buffer 105 exists because of many simultaneous accesses by the plurality of the users. To avoid the above case, a plurality of data buffers 105 can be provided. The plurality of data buffers 105 can be provided for the plurality of the users, respectively. Or the data buffer can be set for each user if the buffer capacity is enough and the number of users is small. In this way, the multi-media storage system of this embodiment processes the access request to the storage 100 from the plurality of the users quickly.

Embodiment 3

In a third embodiment of the present invention, the system is configured the same as the system of Embodiment 1 shown in FIG. 1. However an expected transmitting speed control table is provided for setting the timeout table in this embodiment. The operation will be explained in the following description.

FIG. 9 shows an operation of the control unit 102 of FIG. 1 when the control unit 102 includes an expected transmitting speed control table.

As shown in FIG. 9, the control unit 102 includes the expected transmitting speed control table 122 and a buffer capacity table 123. The other elements are the same as the ones in the control unit 102 of Embodiment 1, as shown in FIG. 2.

Each of FIGS. 10A, 10B, 10C and 10D shows the contents of the tables included in the control unit 102 of FIG. 9.

In this embodiment, the total amount of the data buffer 105 is 1 MB and the buffer size for each user in the data buffer is 100 KB. The buffer size is assigned equally to each user and each buffer size for each user is stored in the buffer capacity table 123 as shown in FIG. 10B.

In both of the above Embodiments 1 and 2, the expected response time is set previously in the timeout table 103 by the user. In this Embodiment 3, the transmitting speed is set in the expected transmitting speed control table 122 instead of setting the expected response time by the user. The above transmitting speed is a data transmitting speed between the data buffer 105 and the host system 130. The disk controller 120 of the control unit 102 calculates the expected response time for each user referring to the expected transmitting speed control table 122 and the buffer capacity table 123. The disk controller 120 sets the calculated result in the timeout table 103 as the expected response time.

The following will explain the calculation of the expected response time for each user by referring to FIGS. 10A–10D.

The expected transmitting speed control table 122 is set for each user when the system is activated. This corresponds to step S1 of the flowchart shown in FIG. 3 of Embodiments 1 and 2. Instead of setting the timeout table at step S1 of FIG. 3, the requested transmitting speed is set in the requested transmitting speed control table 122 in the present embodiment. The above transmitting speed represents a data transmitting speed from the data buffer 105 to the host system 130. An initial value of the transmitting speed, set as a default value is 1 MB/s.

FIG. 10A shows an example of the requested transmitting speed control table 122.

In the example of FIG. 10A, the user 1 requests the transmitting speed 1 MB/s. The buffer capacity assigned to the user 1 is 100 KB as shown in the buffer capacity table 123 of FIG. 10B. Thus, data transmitting time of the 100 KB between the data buffer 105 and the host system 130 is:

100 KB/1 MB/s=100 ms.

In this Embodiment 3, data is requested to be transmitted continuously from the data buffer 105 to the host system 130. The disk controller 120 controls the amount of the data stored in the data buffer 105 so as to not become empty. The disk controller 120 accesses the disk drive 100a to read data and stores the obtained data from the disk drive 100a into the data buffer 105. Referring to the disk configuration table 121 shown in FIG. 2. average seek time for accessing the disk drive 100a is obtained as:

16 ms (average seek time)+4 ms (rotational delay)=20 ms

Accordingly, data cannot be transmitted from the disk drive 100a to the data buffer 105 for a period of 20 ms after starting the seek. The transmitting time of the data of 100 KB from disk drive 100a to the data buffer 105 is obtained as:

100 KB (buffer capacity of the data buffer 105)/10 MB/s (transmitting speed between disk drive and buffer set in the disk configuration table 121 of FIG. 2)=10 ms.

Total transmitting time is 10 ms+20 ms=30 ms including an average seek time. The expected response time of the user 1 is thus calculated by the following expression 100 KB/1 MB/s−(100 KB/10 MB/s+4 ms+16 ms)=70 ms The disk controller 120 observes if the instructed disk drive 100a responds and data transmission to the data buffer 105 can be started within 70 ms. Response times expected by user 2, user 3, . . . , and user n are calculated and set respectively in the timeout table 103 as shown in FIG. 10D. The buffer capacity assigned to each user can be changed based on the amount of data to be processed by each user as shown in FIG. 10C, which increases processing efficiency. When the buffer capacity is assigned to each user and set in the buffer capacity table 123 as shown in FIG. 10C, the expected response time of each user is calculated as shown in the timeout table 103 of FIG. 11.

As has been described, the expected response time is calculated based on the data transmitting speed expected by each user and each calculated result is set in the timeout table. In this embodiment, the buffer can be used more efficiently.

Embodiment 4

In a fourth embodiment of the present invention, the timeout table is set based on the expected response time control table, and is in the same system configuration as the above Embodiment 1 of FIG. 1.

FIG. 12 shows an operation of the control unit of FIG. 9, which further includes an expected response time control table.

In FIG. 12, an expected response time control table 124 is added to the control unit 102. The expected response time control table 124 is set for each user when the system activates. The disk controller 120 calculates an expected response time of each user referring to the expected response time control table 124 and the disk configuration table 121. Each calculated result is set in the timeout table 103.

FIG. 13 shows the contents set in the expected response time control table 124.

For example, the user 1 sets the response time "100 ms" as shown in FIG. 13. The response time represents a time period from the start of the access request from the disk controller 120 to the disk drive 100a, until the end of the data transmission to the data buffer 105. It is assumed that the data is continuously transmitted from the data buffer 105 to the host system 130. Therefore, on calculating the expected response time, the seek time should be subtracted from the response time set by the user 1, because no data is transmitted from the disk drive 100a to the data buffer 105 during the seek. The expected response time of the user 1 is thus calculated by the following expression based on the above response time, and the disk configuration table 121:

$$100 \text{ ms} - (16 \text{ ms} + 4 \text{ ms}) = 80 \text{ ms}$$

Response times expected by user 2, user 3, . . . , and user n are calculated and set respectively in the timeout table 103 as shown in FIG. 12.

In this embodiment, the expected response time can be calculated based on the response time set by each user. The process can be executed at a speed required by each user.

Embodiment 5

In a fifth embodiment of the present invention, the expected response times are calculated based on the requested transmitting speed control table and based on the expected response time control table, respectively, in the same system configuration as Embodiment 1 of FIG. 1. The smaller result of the above two calculations is selected and set in the timeout table.

FIG. 14 shows an operation of the control unit 102 of FIG. 1, which further includes the requested transmitting speed control table and the expected response time control table.

In FIG. 14, the requested transmitting speed control table 122, the buffer capacity table 123 and the expected response time control table 124 are added to the control unit 102. The other elements are the same as the ones in Embodiment 1 of FIG. 2.

FIG. 15 shows the contents of the timeout table.

Each user sets a value in the requested transmitting speed control table 122 and the expected response time control table 124 when the system is activated. The control unit 102 calculates the expected response time of each user based on the requested transmitting speed control table 122, the expected response time control table 124, the disk configuration table 121 and the buffer capacity table 123. The calculation results are set in the timeout table 103 as the expected response time. In the following example, the expected response time of the user 1 is calculated.

According to the requested transmitting speed control table 122 of FIG. 10A, the user 1 requests 1 MB/s. The buffer capacity assigned to the user 1 is 100 KB as shown in the buffer capacity table 123 of FIG. 10B.

The expected response time of the user 1 is calculated by the following expression based on the above two values and the disk configuration table 121:

$$100 \text{ KB}/1 \text{ MB/s} - (100 \text{ KB}/10 \text{ MB/s} + 4 \text{ ms} + 16 \text{ ms}) = 70 \text{ ms}$$

The response time of the user 1 is 100 ms as shown in the expected response time control table 124 of FIG. 13. The expected response time is calculated in another way by the following expression based on the above response time 100 ms:

$$100 \text{ ms} - (16 \text{ ms} + 4 \text{ ms}) = 80 \text{ ms}$$

In this embodiment, the smaller result of the above two calculations is selected as the expected response time. In the above case, 70 ms is selected as the expected response time of the user 1. In the same way, the expected response times of user 2 and user 3 are also calculated. For user 2, the calculation results are 20 ms based on the transmitting speed and 180 ms based on the response time. In this case, 20 ms is selected as the expected response time of user 2. In case of user 3, 19 ms is selected as the expected response time out of the two calculation results; one is 20 ms based on the transmitting speed and the other is 19 ms based on the response time.

As described above, the expected response time is calculated in two ways; based on the transmitting speed and based on the response time and one of the two calculation results is selected to be set as the value in the timeout table.

In the above examples explained in Embodiments 3–Embodiment 5, the storage is configured in a mirror configuration. The expected response time can be calculated, based on the transmitting speed and the response time, in the case of the RAID configuration as Embodiment 2.

In Embodiments 1–5, "timer A" is set to the predetermined value referring to the timeout table. The value of "timer A" can be updated according to the buffer capacity. In this case, the buffer capacity table 123 additionally stores unused available buffer capacity for each user, as well as the buffer capacity for each user shown in the buffer capacity table of FIG. 10C. The unused available buffer capacity of the buffer is set and updated by the disk controller 120. The disk controller 120 checks the unused available buffer capacity for each user referring to the data buffer 105 at predetermined times and sets or updates the unused available buffer capacity for each user in the buffer capacity table 123. The disk controller 120 calculates the expected response time based on the unused available buffer capacity in the buffer capacity table 123, the data transmitting speed from from the data buffer 105 to the host system 130, and the data transmitting speed from the storage 100 to the data buffer 105.

In the system configured as described in the above Embodiments 1–5, the maximum response time for continuous data transmission can be guaranteed by setting the expected response time from the issue of the I/O instruction. On the contrary, in the Related Art 2, Japanese Unexamined patent publication No. HEI2-81123, the maximum response time cannot be guaranteed because the delay of the data is detected for recovering the data. In the present invention, however, data transmission to the host system can be continued by providing the redundant data or the recovered data to the data buffer before the timeout of the maximum response time, even when some part of the data is delayed or not read. In the above related art, data transmission is suspended while the delay of the data is detected.

In the above related art, data is transmitted in parallel. According to the present invention, the disk drive is connected to the hard disk controller and stores NRZ (nonreturn-to-zero code) data. The disk drive does not include an internal data buffer. Data transmitting begins when the Read/Write head reaches the cylinder of the hard disk requested by the I/O instruction received from the hard disk controller. The hard disk controller detects a sector error by an ECC (Error Check Code) after starting the data transmission and an error recovery procedure starts on detecting the error, which causes the data transmitting speed to be delayed. To solve the above problem, in the above related art, the delay of the arriving data to the hard disk controller is detected for error detection prior to the error detection by the ECC. However, the related art can be applied to, and is effective in, a system where a plurality of the disks transmit data synchronously (in a parallel data transmitting disk system). According to the related art, a timer for detecting the delay of data is set as:

minimum time (ts min.): a time sufficient to avoid improper detection of missynchronization For example, 1% missynchronization is allowed in the case of a 3600 rpm disk drive. "ts min." is obtained by the following expression:

$$ts \text{ min.} = 16.6 \text{ ms} * 1\% = 166 \text{ μs}$$

maximum time (ts max.) is the time to start processing a sector next to the sector in which missynchronization is detected (If an arriving time for one sector in one disk drive exceeds this maximum time from other arriving times for other sectors of other disks, it is decided that the delayed sector is missynchronized to the sectors of the other disks. The missynchronization causes a delay of 1 rotation of the data transmission.).

For example, when there are 60 sectors on one track in the case of 3600 rpm disk drive, "ts max." is obtained by the following expression:

ts max. =16.6 ms/60=276 µs

According to the above examples, "ts max." can be set to about 200 µs. However, if the maximum time is longer, the recovery process of the faulty sector influences to the next sector (because the data buffer from the faulty disk is empty). Data in the next sector may have to be recovered serially, which reduces the reliability of the data (that is, one faulty sector influences to the following operation). To avoid the above problem, the maximum time to detect the error should be shortened, however, it is impossible for the maximum time to be less than the minimum time because missynchronization is detected improperly in such a shortened error detecting time period.

As described above, it may be impossible to execute the error recovery by detection of a delay of data and there also may be a problem in the reliability of the data. Furthermore, it can be applied to only a parallel data transmitting disk drive system.

Embodiment 6

In a sixth embodiment of the present invention, a multimedia storage system includes a plurality of disks, each of which records a certain group of multi-media data, and a redundant disk drive storing redundant data of the multi-media data stored in the above plurality of disk drives. A control unit connects to the plurality of disk drives and the redundant disk drive as a RAID system. When an additional disk drive is connected to the control unit via an adding port, a compute mechanism for computing redundant data computes new redundant data based on the redundant data stored in the redundant disk drive for the plurality of disk drives and the multi-media data stored in the new disk drive. The redundant data stored in the redundant disk drive is updated with the new redundant data obtained by the compute mechanism.

FIG. 16 shows a system configuration according to the sixth embodiment.

In FIG. 16 a RAID control unit 213 includes a plurality of ports 214 for connecting a plurality of disk drives. A plurality of disk drives 210 is respectively connected to the plurality of ports 214. Each of the plurality of disk drives 210 stores a group of multi-media data. A redundant disk drive 211 stores redundant data of the multi-media data stored in the plurality of disk drives 210 and is connected to the port 214. The plurality of disk drives 210 and the redundant disk drive 211 form a RAID system 212. The RAID control unit 213 includes a compute mechanism 215 for computing redundant data and an access suspend mechanism 216. When a new disk drive 210 is added to the RAID system 212, the compute mechanism 215 for the redundant data computes new redundant data based on the multi-media data stored in the new disk drive 210 and the redundant data already stored in the redundant disk drive 211. When one of the disk drives 210 of the RAID system 212 becomes faulty, the access suspend mechanism 216 suspends the RAID control unit 213 to access the faulty disk drive.

FIG. 17 shows the logical expressions for computing redundant data.

FIG. 18A shows an original configuration of the RAID system. FIG. 18B shows the RAID system of FIG. 18A including an additional disk drive 210.

FIG. 19A shows an operation of generating a new parity data. FIG. 19B shows a new configuration including the additional disk drive.

In FIG. 16, the RAID system 212 is configured as RAID level 4.

FIGS. 18A and 18B show connecting examples of the disk drives and the RAID control unit.

In FIG. 18A, three disk drives 210 (#0, #1, #2) and the redundant disk drive 211 (#P) are connected to the RAID control unit 213. A new disk drive 210 (#3) is additionally connected to the RAID control unit 213 via the port 214 (the port 214 is not shown in the figure) as shown in FIG. 18B. After the new disk drive is added, the compute mechanism 215 for redundant data reads the data of the additional disk drive (D3) and the old parity (DP0) already stored in the redundant disk drive 211, simultaneously. The compute mechanism 215 for the redundant data computes new redundant data (DPN) based on the above data by referring to the expression shown in FIG. 17.

As shown in FIG. 17(A), when data Dk (k=0, 1, 2, ...) of the same address stored in each disk #k (k=0, 1, 2, ...) in one parity group are XORed (exclusive OR), the result is "0" in the RAID system. In FIG. 18A, four disk drives 210 (#0, #1, #2) and 211 (#P for parity) are connected to the RAID control unit 213. "0" is obtained for the parity, based on the data D0, D1, D2, DP0 (parity data) respectively stored in each of the above four disk drives 210 and 211 as shown in FIG. 17(B). In FIG. 17(B), DP0 shows old parity data for the three disk drives of the RAID system before the new disk drive 210 #3 is added. When a new disk drive 210 #3 is added (the disk drive 210 #3 stores data D3) as shown in FIG. 18B, the XORed result of data D0, D1, D2, D3 and DPN, which are respectively stored in five disk drives, should be "0" as shown in FIG. 17(C). (In FIG. 17(C), DPN shows new parity data for the four disk drives of the RAID system including the additional disk drive 210 #3. The new parity data DPN is stored in the disk drive 211 #P to update the old parity data DP0.)

A logic expression of FIG. 17(D) is obtained from the expressions of FIG. 17(B) and FIG. 17(C). As shown in FIG. 17(D), the new parity data DPN is the XORed result of the old parity data DPO and D3. The above operation is executed by the compute mechanism 215 for the redundant data.

The compute mechanism 215 for the redundant data is included in the RAID control unit 213 as shown in FIG. 16. The compute mechanism 215 for the redundant data may be excluded from the RAID system.

When the compute mechanism 215 for the redundant data is placed outside of the RAID system as shown in FIGS. 19A and 19B, the new parity data is stored in an additional disk drive for parity data. The new parity disk drive should be exchanged with the parity disk drive of the original configuration at the same time as adding the new disk drive storing data.

In the following description an operation of the system configured as shown in FIGS. 19A and 19B, where the compute mechanism 215 is excluded from the RAID system 213, will be explained.

As shown in FIG. 19A, the RAID control unit 213 is connected to the disk drives 210 #0 #1 #2 and the disk drive 211 #P1 which stores parity data #P1. When a new disk drive 210 #3 is additionally connected to the RAID control unit 213 new parity data DPN should be computed by the compute mechanism 215 for the redundant data. The compute mechanism 215 is connected to the parity disk drive 211 #P1 where the parity data is already stored. The parity disk drive 211 #P1 is connected to both RAID control unit 213 and compute mechanism 215 via the dual port. The compute mechanism 215 is also connected to the new disk drive 210 #3 for storing data and a new parity disk drive 211 #P2 for storing new parity data. The compute mechanism 215 reads data D3 stored in the disk drive 210 #3 and the parity data (the old parity data DPO) stored in the parity disk drive 211 #P1. New parity data (DPN) is computed by an XOR operation of DPO and D3. The XORed result, DPN is stored in the parity disk drive 211 #P2. Then, as shown in FIG. 19B, the new disk drive 210 #3 and the new parity disk drive 211 #P2 are connected to the RAID control unit 213. The old parity disk drive 211 #P1 is disconnected from the RAID control unit 213. The disconnected parity disk drive 211 #P1 is kept for the next use.

In the system configured as shown in FIGS. 18A and 18B, where the compute mechanism 215 for the redundant data is included in the RAID control unit 213, once the compute mechanism 215 is included, no other specific resource is required. However, an access to the disk drive from the host system and an update of the parity data should be executed in parallel, which temporally reduces access performance of the system. And in this system, when one of the disk drives becomes faulty while parity data is being updated, error data cannot be recovered until the parity data is updated completely.

In the system configured as shown in FIGS. 19A and 19B, where the compute mechanism 215 for the redundant data is excluded from the RAID control unit 213, the parity data is updated simultaneously when a new disk drive is added. The performance or the reliability of the system is not influenced by the addition of the new disk drive. However, another unit is required for computing and writing new parity data besides the RAID control unit, which is a disadvantage of this system. Furthermore, another parity disk drive is required for storing new parity data and for exchanging with the old parity disk drive, which causes the system to cost more.

The user may choose one of the above two systems for this embodiment.

In the system configured as shown in FIG. 16, the disk drive 210 #0 stores video data "video A", the disk drive 210 #1 stores video data "video B", the disk drive 210 #2 stores video data "video C", and the parity disk drive 211 #P stores parity data of the data stored in the three disk drives. If the disk drive 210 #1 becomes faulty, the error does not influence the system efficiency because the disk drive 210 #1 is not accessed by the user except when the user accesses the data of "video B". In the above case, when the user tries to access "video B" stored in the faulty disk drive #1, the error data of "video B" of the disk drive 210 #1 can be recovered based on the parity data stored in the parity disk drive 211 #P, and data stored in the disk drives 210 #0, #2. As described above, the user can access data of "video B" even if the disk drive 210 #1 becomes faulty.

In this embodiment, groups of data are stored in each of a plurality of disk drives. Even if one of the plurality of disk drives becomes faulty, the user can obtain the multi-media data from one of the other disk drives without recovering the error data of the faulty disk drive. The control unit has a port for connecting a new disk drive. Another group of multi-media data can be added to the system by connecting a new disk drive via the above port. The compute mechanism for the redundant data may be provided either inside or outside of the control unit. New parity data can be computed easily when another group of multi-media data is added to the system.

Embodiment 7

In a seventh embodiment of the invention, an access suspension mechanism 216 is provided with the RAID control unit 213 as shown in FIG. 16.

The access suspension mechanism 216 suspends an access to the multi-media data stored in the faulty disk drive 210 when one of the disk drives 210 connected to the RAID control unit 213 becomes faulty.

The access suspension mechanism 216 determines whether the system receives "many accesses" or "few accesses" from a user by checking how many disk drives receive consecutive Read requests, for example, in the following three ways:

1) analyze the queuing commands in a command queue by checking which queuing command is directed to which disk drive;

2) check whether or not there has been a command received for each disk drive in a predetermined number (e.g., 20 times) of received commands; and 3) check whether or not there has been a command executed for each disk drive in a predetermined time period (e.g., 10 seconds).

Based on one of the above checking results, for example, if more than three disk drives receive access, it is judged "many accesses" and if less than two disk drives receive access, it is judged "few accesses".

When the system receives "few accesses", the video data stored in the faulty disk drive is recovered by the data stored in the other normal disk drives. When the system receives "many accesses", the access suspension mechanism 216 suspends to access the video data stored in the faulty disk drive until the system receives "few accesses". "Few accesses" or "many accesses" is determined based on one of the above three ways. This is because the system efficiency is reduced by the recovery procedure of the faulty data stored in the faulty disk drive when the system receives "many accesses". The data stored in the other normal disk drives can be accessed.

Thus, even if one of the disk drives becomes faulty, the fault does not influence the video data stored in the other disk drives.

As described above, the access suspension mechanism suspends the access to the multi-media data stored in the faulty disk drive. If one of the disk drives becomes faulty, the recovery procedure by the parity data is not executed while the access suspension mechanism suspends the access.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. A multi-media storage system comprising:

(a) a storage device storing data and redundant data; and (b) a control unit for accessing the data and redundant data stored in the storage device to provide data in response to a request;

wherein the control unit includes:

a timeout table storing a first time limit for providing data after a request;

a data generator generating data from the redundant data stored in the storage device to provide the data in response to the request, when an access to said storage device is not completed when the first time limit has passed, so that the data is provided in response to the request within a second time limit after the first time limit a data buffer area for temporarily storing data and redundant data from the storage device for accesses to the storage device; and wherein the timeout table stores a plurality of first time limits corresponding to a plurality of users based on a size of available data buffer area so that the data buffer is not emptied before at least a portion of the data accessed from the storage device is stored in the data buffer.

2. The multi-media storage system of claim 1, wherein the storage device is configured as a RAID (Redundant Arrays of Inexpensive Disks) system, and wherein the control unit includes a RAID controller.

3. The multi-media storage system of claim 1, wherein the timeout table stores a plurality of said first time limits corresponding to a plurality of users, and the data generator generates the data when an access is not completed when one of said first time limits, corresponding to a selected one of the users, has passed.

4. The multi-media storage system of claim 3, wherein one of the first time limits is based on a data transmitting speed required by a corresponding user.

5. The multi-media storage system of claim 3, wherein one of the first time limits is based on a response time required by a corresponding user.

6. The multi-media storage system of claim 3, wherein one of the first time limits is based on a response time and a data transmitting speed required by a corresponding user.

7. The multi-media storage system of claim 1, wherein:
the storage device comprises a first storage device storing the data and a second storage device storing the redundant data; and
the control unit accesses the second storage device to retrieve redundant data simultaneously with accessing the first storage device to retrieve data in response to the request.

8. The multi-media storage system as in claim 1, wherein the timeout table stores a third time limit, and wherein the control unit further includes:
means for reaccessing the storage device when an access to the storage device is completed after the first time limit and before the third time limit;
means for disconnecting the storage device when an access to the storage device is not completed before the third time limit;
means for disconnecting the storage device after a predetermined number of reaccesses have occurred.

9. A multi-media storage system comprising:
(a) a plurality of data disk drives for respectively storing of multi-media data;
(b) a redundant disk drive for storing redundant data of the multi-media data stored in the plurality of disk drives; and
(c) a control unit, including;
a plurality of ports connected to the plurality of disk drives and the redundant disk drive, for accessing the plurality of disk drives and the redundant disk drive to provide data in response to a request and at least one unused port connectable to a disk drive; the multi-media storage system further comprising:
a new disk drive storing multi-media data to be attached to the at least one unused port; and
a compute means for computing new redundant data based on the redundant data stored in the redundant disk drive and the multi-media data stored in the new disk drive and storing the new redundant data in the redundant disk drive, when the new disk drive is connected to the at least one unused port.

10. The multi-media storage system of claim 9, further comprising an access suspension means for suspending access to a group of multi-media data of a faulty disk drive in case that one of the plurality of disk drives becomes faulty.

11. A data accessing method for a multi-media storage system having a plurality of disk drives, coupled to users through a host system and having a storage device, a control unit and a data buffer, the data storing method comprising the steps of:
storing data and redundant data in the storage device;
setting a first time limit in a timeout table in the control unit for each user;
receiving a data access request from the host system for data;
setting a first timer upon receiving the data access request based upon the time limit set in the timeout table;
issuing a data access instruction to one of the disk drives;
generating redundant data to transmit to the host system when the one disk drive does not respond within the first time limit as determined by the first timer so that the data is provided in response to the request within a second time limit after the first time limit temporarily storing data and redundant data from the storage device for accesses to the storage device in the data buffer, and wherein the timeout table stores a plurality of first time limits corresponding to a plurality of users based on a size of available data buffer area so that the data buffer is not emptied before at least a portion of the data accessed from the storage device is stored in the data buffer.

12. The data storing method of claim 11, further comprising the steps of:
setting a second timer with a third time limit;
disconnecting the one disk drive and indicating to the control unit a fault of the one disk drive, when the one disk drive does not respond within the third time limit determined by the second timer;
determining if data stored in the one disk drive can be recovered by a retry function when the disk drive responds after the first time limit and within the third time limit;
recovering the data stored in the one disk drive by the retry function when the data is able to be recovered;
writing the redundant data generated at the generating step into the one disk drive when the data of the one disk drive is unable to be recovered by the retry function.

13. The data storing method of claim 12, comprising the steps of:
outputting an error to an error log of the control unit when the data of the one disk drive is unable to be recovered by the retry function;
determining if a number of errors in the error log for the one disk drive exceeds a predetermined number of errors;

disconnecting the one disk drive and indicating to the control unit a fault of the one disk drive when the number of errors exceeds the predetermined number of errors.

14. A data storing method for a multi-media storage system including a plurality of disk drives for respectively storing one group of multi-media data, a disk drive for storing redundant data, and a control unit connected to the plurality of the disk drives, and connected to the disk drive for storing redundant data, the data storing method comprising the step of:

adding a new disk drive storing a new group of multi-media data to the multi-media storage system by connecting the new disk drive to the control unit;

computing new redundant data based on the redundant data stored in the disk drive for storing redundant data and the new group of multi-media data stored in the new disk drive; and storing the new redundant data in the disk drive for redundant data.

15. The data storing method of claim 14, further comprising the step of suspending access to a group of multi-media data of one of the plurality of the disk drives when the one disk drives becomes faulty.

* * * * *